(12) United States Patent
Linnartz et al.

(10) Patent No.: US 10,833,765 B2
(45) Date of Patent: Nov. 10, 2020

(54) ILLUMINATION SYSTEM FOR COMMUNICATING DATA

(71) Applicant: SIGNIFY HOLDING B.V., Eindhoven (NL)

(72) Inventors: Johan-Paul Marie Gerard Linnartz, Eindhoven (NL); Kumar Arulandu, Eindhoven (NL); Fernand Courtois, Eindhoven (NL); Xavier Chatel, Eindhoven (NL); Walter Jaudard, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/627,436

(22) PCT Filed: Jul. 10, 2018

(86) PCT No.: PCT/EP2018/068610
§ 371 (c)(1),
(2) Date: Dec. 30, 2019

(87) PCT Pub. No.: WO2019/016024
PCT Pub. Date: Jan. 24, 2019

(65) Prior Publication Data
US 2020/0153506 A1 May 14, 2020

(30) Foreign Application Priority Data

Jul. 19, 2017 (EP) ..................................... 17182125

(51) Int. Cl.
*H04B 10/116* (2013.01)
*H05B 47/195* (2020.01)
(Continued)

(52) U.S. Cl.
CPC ............. *H04B 10/116* (2013.01); *H04B 3/54* (2013.01); *H04B 10/502* (2013.01); *H05B 47/195* (2020.01)

(58) Field of Classification Search
CPC ............................................ H04B 10/114–116
See application file for complete search history.

(56) References Cited

U.S. PATENT DOCUMENTS

2006/0056855 A1* 3/2006 Nakagawa ................ G09F 9/33
398/183
2010/0209105 A1 8/2010 Shin et al.
(Continued)

FOREIGN PATENT DOCUMENTS

WO 200042719 A1 7/2000
WO 2016118058 A1 7/2016

OTHER PUBLICATIONS

Chi Nan, et al., "Advancing the Capacity of Phosphorescent White LED Based Visible Light Communication Network", 2015 IEEE Summer Topicals Meeting Series (SUM), IEEE, Jul. 13, 2015, pp. 33-34.

*Primary Examiner* — Nathan M Cors
(74) *Attorney, Agent, or Firm* — Akarsh P. Belagodu

(57) ABSTRACT

An uplink subsystem for use in an illumination system arranged for optical communication as well as the illumination system, the system comprising a downlink subsystem and the uplink subsystem. The uplink subsystem comprises sensors (e.g. infrared sensor) embedded in each luminaire in the group. The uplink subsystem also comprises a demodulator, and a distribution network for supplying the signals sensed to an adaptor to combine instances of the sensed uplink signal in a manner that takes into account a Time Division Medium Access scheme and a demodulator to demodulated the combined signal. The system further comprising a downlink subsystem that in turn comprises a (Continued)

modulator for generating a modulated waveform, and an optical fiber distribution network to distribute the modulated waveform to each luminaire in a group. Each such luminaire generates a drive current for driving a lighting element of that luminaire to emit light. Each also injects the modulated waveform into its drive current so as to embed the downlink signal in the emitted light.

15 Claims, 8 Drawing Sheets

(51) Int. Cl.
    *H04B 3/54*           (2006.01)
    *H04B 10/50*        (2013.01)

(56)                 References Cited

U.S. PATENT DOCUMENTS

| | | | |
|---|---|---|---|
| 2014/0086590 A1* | 3/2014 | Ganick | H04W 12/06 |
| | | | 398/118 |
| 2017/0346559 A1* | 11/2017 | Eroglu | H04B 10/07953 |
| 2018/0069628 A1* | 3/2018 | Wei | H04B 10/116 |
| 2018/0254835 A1* | 9/2018 | Breuer | G01S 1/7034 |
| 2018/0302159 A1* | 10/2018 | Ritchie | H04B 10/1149 |

* cited by examiner

ILLUMINATION SYSTEM FOR COMMUNICATING DATA

CROSS-REFERENCE TO PRIOR APPLICATIONS

This application is the U.S. National Phase application under 35 U.S.C. § 371 of International Application No. PCT/EP2018/068610, filed on Jul. 10, 2018, which claims the benefit of European Patent Application No. 17182125.9, filed on Jul. 19, 2017. These applications are hereby incorporated by reference herein.

TECHNICAL FIELD

The present disclosure relates to an illumination system for illuminating an environment and also enabling communication of data between the illumination system and a user device on a downlink and/or uplink. The downlink signal may be embedded in visible light or infrared light emitted by the luminaires of the system. The uplink may advantageously utilize a short-range, unlicensed medium such as infrared.

BACKGROUND

Visible light communication (VLC) refers to techniques whereby information is communicated in the form of a signal embedded in the visible light emitted by a light source. VLC is sometimes also referred to as coded light. The signal is embedded by modulating a property of the visible light, typically the intensity, according to any of a variety of suitable modulation techniques. For instance this enables a sequence of data symbols to be modulated into the light emitted by a light source. Based on the modulations, the information in the coded light can be detected using any suitable light sensor. This can be either a dedicated photocell (point detector), or a camera comprising an array of photocells (pixels) and a lens for forming an image on the array. E.g. the sensor may be a dedicated photocell included in a dongle which plugs into a mobile user device such as a smartphone, tablet or laptop; or the sensor may be a general purpose camera integrated into the mobile user device. Either way this may enable an application running on the user device to receive data via the light.

VLC is often used to embed a signal in the light emitted by an illumination source such as an everyday luminaire, e.g. room lighting or outdoor lighting, thus allowing the illumination from the luminaires to double as a carrier of information. The light thus comprises both a visible illumination contribution for illuminating a target environment such as room (typically the primary purpose of the light), and an embedded signal for providing information into the environment (typically considered a secondary function of the light). In such cases, the modulation is typically performed at a high enough frequency so as to be beyond human perception, or, if any lower frequency components are present, at least such that any visible temporal light artifacts (e.g. flicker and/or strobe artifacts) are weak enough not to be noticeable or at least to be tolerable to humans. Thus the embedded signal does not affect the primary illumination function, i.e. so the user only perceives the overall illumination and not the effect of the data being modulated into that illumination. This is typically achieved by choosing a DC free code or modulation scheme, wherein the power spectral density goes to zero at zero Hertz, with very little spectral content at low frequencies (relative to the overall DC light intensity level; i.e. the symbols are modulated as positive and negative fluctuations relative to a non-zero DC offset corresponding to the overall visible illumination intensity, but the code or modulation scheme in itself is DC free relative to this level). Thus visible flicker is reduced to a practically invisible level.

E.g. Manchester coding is an example of a DC free code. Ternary Manchester is $DC^2$ free, meaning not only does the power spectral density go to zero at zero Hertz, but the gradient of the power spectral density also goes to zero, thus eliminating visible flicker even further. For higher speeds, Pulse amplitude Modulation (PAM) and variants of multi-carrier modulation, in particular Orthogonal Frequency Division Multiplexing (OFDM) modulation are popular modulation methods. OFDM data also does not contain a DC term and only contains real (non-imaginary) signals. PAM is a popular method used in infrared (IR) wireless optical communication optical.

Interest is also growing in providing a parallel uplink connection embedded in a luminaire so that the luminaire can provide full duplex communication, e.g. so that the luminaire can act as an access point via which the application on the user device can access the Internet or other data service. For instance the downlink from the luminaire access point may use visible light and the uplink may use Infrared light as the communication medium. An embedded infrared transmitter may be included in a dongle or embedded in the housing of the user device itself in order to enable the uplink communication with the luminaire. An example of a known technology for bidirectional light communications is Li-Fi.

US patent application US2006/056855 A1 discloses an LED based communication system comprising an uplink subsystem and a downlink subsystem, wherein the uplink system comprises delay correcting units to account for different delays in the uplink signal as received by the lighting side communication devices originating from the terminal side communication device.

SUMMARY

One issue with existing light-based communication systems is handover and interference between cells. Consider the case where each individual luminaire is its own separate access point, i.e. one cell per luminaire. In a small region such as a room there could be multiple such luminaires each with limited range, and so a mobile user device trying to communicate via the lighting system may see mutually interfering signals from the different luminaires, and may find itself handing over between individual luminaries multiple times in short succession.

To avoid this, the present disclosure provides a system in which multiple luminaires in a given region (e.g. a given room) all emit light embedded with the same downlink signal. Thus wherever the mobile device moves within the region in question (e.g. the room), no handover is needed and no inter-signal interference is experienced between those luminaires (i.e. interference from different data). From the device's perspective the region forms one large cell and the device does not need to know that it is transitioning from receiving its signal predominantly from one luminaire to another. Handover is only needed if the mobile device moves outside of this region, e.g. to a neighboring room.

However, if this was implemented using traditional VLC enabled luminaires, one practical issue is that there would be a lot of redundancy: each luminaire would include its own separate modulator simply to generate an instance of the same signal, which is wasteful of resources. Furthermore, to control all the modulators to do this, a complex, highly accurate synchronization mechanism would be needed between luminaires.

To address this, the present disclosure provides a system in which a centralized modulator is arranged to generate a modulated waveform, and this centrally-generated modulation waveform is distributed from the central modulator to each of the luminaries in a group (corresponding to a cell). At each luminaire, a signal injector injects the waveform into the otherwise steady current generated by that luminaire's driver to drive the respective light source. Thus the same waveform (and therefore same signal) is embedded into the light emitted by each of the luminaires in the group (i.e. the cell) without the need for duplication of modulators and without the need for a complex synchronization mechanism between the luminaires in question.

On the other hand however, under such a system, phase differences may be introduced between the different instances of the downlink signal emitted by the different respective luminaires. One potential source of such phase differences is the distribution network for distributing the centrally-generated modulation waveform to the different luminaires: if the modulated waveform was delivered via conventional means such as conventional coaxial cable or power line communications, the different lengths of cable between the modulator and the different luminaires would introduce different delays. Hence whilst there may be no inter-signal interference (interference between different signals), the different instances of the same signal as received at the user device may nonetheless be incoherent, resulting in potentially destructive self-interference and therefore hindering detection. According to the present disclosure, this issue may be solved by choosing optical fiber as the medium for distributing the modulated waveform to the different luminaires.

Although it is known from the art to combine uplink signals within an uplink subsystem of a communication system, the prior art uplink subsystems may be further improved.

According to one aspect disclosed herein, there is provided an uplink subsystem for use in an illumination system arranged for optical communication, the uplink subsystem comprising: a group of luminaires; a group of sensors each for sampling a respective instance of an uplink signal transmitted wirelessly from a user device, with a different respective one of the sensors being incorporated in or co-located with each of the luminaires of said group, or the sensors being interspersed amongst the luminaires so as to serve a same region of space as illuminated by the group of luminaires; a demodulator unit; and an uplink distribution network arranged to supply the respective instance of the uplink signal from each of group of the sensors to the demodulator unit; wherein the demodulator unit comprises an adaptor arranged so as, based on a measurement of a respective received signal strength of each of the instances of the uplink signal, to apply a respective weight to each instance in dependence on the respective measurement of received signal strength, and to combine said instances of the uplink signal following the application of said weights, thereby producing a combined signal; and the demodulator unit further comprises a demodulator arranged to demodulate the combined signal wherein the uplink subsystem utilizes a Time Division Multiplex Access scheme in which time-slots are assigned to individual uplink users and wherein the adaptor (13) assigns weights on a time-slot basis based on a respective uplink user assigned to a respective time-slot and previously recorded instances where said uplink user signal was detected, such that the switching of the weights for the instances of the uplink signal are synchronized with the time-slots and the weights are adapted for expected arrival of instances of signals from the uplink user associated with the current time-slot.

Thus by sending all the received signal instances upstream to a central demodulator and combining the strongest contributions before demodulation, this again advantageously allows the user device to quickly transition from luminaire to luminaire or node to node without having to incur the complexity of a handover at the protocol layer. As the user device moves from being nearby one luminaire to another, the strongest signals will simply be automatically selected at the physical layer to use for demodulation, and so in essence all the luminaires in the group act as a single cell from the perspective of the uplink. But by using only the strongest signals, this allows multiple receiving nodes to act as a single cell whilst mitigating the noise from the most weakly receiving nodes.

The inventors have further recognized that in particular when using a time division multiple access (TDMA) system in which different time slots are assigned to different users in the uplink; such an adaptor may be further improved in that the weights of instances of the uplink signal preferably are switched in synchronization with the time-slot allocation. In addition the weights assigned to instances of signals from an uplink user may be adapted for the respective uplink user, such that locations; i.e. the sensor locations where instances of the user signal previously were detected are favored in the weighting. By assigning the weights in synchronization with expected messages from an uplink user and adapted for the respective user an improved combining of the instances of the user uplink signal is possible.

In embodiments the adaptor uses a centralized approach wherein signals from the respective sensors (which may already perform a local automatic gain) are subsequently forwarded to a central adaptor, thereby forming a star topology, that allows the instances of the user signals to be centrally weighted.

In embodiments the adaptor may also use a distributed approach wherein signals from the respective sensors are combined in a distributed manner. A distributed implementation allows for a wider variety of topologies, e.g. comprising multiple stars, or tree structures that allows a more efficient cabling than the star configuration. A particularly efficient distributed approach is the daisy-chain approach. Although subsequent combining of inputs may introduce more noise than the star configuration, it can be much more efficient from a cable-length point of view. In addition further measures may be implemented to reduce the introduction of noise resulting from subsequent combining; e.g. by locally using a weight of zero, i.e. gating the local input where possible, to avoid noise or interference accumulation.

In embodiments the adaptor may be configured to select said weights from a set comprising at least zero and one (i.e. unity), and to select some of the weights to be zero if the respective measurement of received signal strength is below a threshold.

Alternatively the weighting may comprise weighting each of the received signal instances in proportion to their respective received signal strength.

In embodiments the measurement of signal strength may be based on a predetermined preamble of the uplink signal.

In embodiments the measurement of received signal strength may be a measure of signal strength relative to a noise floor; wherein the noise floor may be predetermined, or the adaptor may be configured to determine the noise floor empirically based on a predetermined preamble in the uplink signal or a noise estimation algorithm which estimates the noise floor in presence during estimated periods of no uplink signal.

In embodiments the uplink distribution network via which the instances of the uplink signal are supplied to demodulator unit may be wholly or partially formed from optical fiber.

In embodiments each of the luminaires may also arranged to emit a downlink signal by visible light communication for detection by the user device.

In embodiments each of said sensors may comprise an infrared sensor, in which case the uplink signal is received from the user device via infrared.

Alternatively the uplink could use another medium, e.g. another unlicensed medium such as ultrasound.

According to another aspect disclosed herein, there is provided an illumination system arranged for optical communication, the illumination system comprising an uplink subsystem as described herein above and a downlink subsystem. The downlink subsystem comprising: a group of luminaires; a modulator unit for controlling the group of luminaires to emit a downlink signal for detection by a user device; and a downlink distribution network formed from optical fiber, connecting the modulator unit to each of the luminaires in said group via the optical fiber; wherein the modulator unit comprises a modulator configured to generate a modulated waveform corresponding to the downlink signal, and an optical transmitter arranged to transmit the modulated waveform to each of the luminaires in said group over the optical fiber of the downlink distribution network; each of the luminaires in said group comprises a lighting element for emitting light, and driver circuitry for driving the lighting element with a drive current powering the lighting element to emit said light; and each of the luminaires in the group further comprises an optical receiver arranged to receive the same modulated waveform from the modulator over the optical fiber of the downlink distribution network, and a signal injector arranged to inject the modulated waveform into said drive current in order to cause the downlink signal to be embedded in the emitted light.

Preferably said lighting element is an illumination element for emitting visible illumination, said light in which the downlink signal is embedded being the visible illumination.

Alternatively the lighting element could be an infrared element for emitting said light in the form of infrared light, in addition to visible illumination emitted by the luminaire. In this case the light in which the downlink signal is embedded is the infrared light.

In embodiments the optical fiber of the downlink distribution network may wholly or partially comprise plastic optical fiber.

Alternatively the optical fiber distribution network may be formed wholly or partially of glass optical fiber. Plastic fiber is thicker (e.g. 1 mm diameter) and easier to handle by construction workers, but the option of glass fiber is not excluded. Another possibility is high quality coaxial cable, though optical fiber is preferred due to minimize phase shifts in transmission.

Another advantageous feature of choosing optical fiber for the distribution of the modulated waveform is that it is electrically isolating and easy to install. For instance conventional coaxial cable is not allowed to be routed through the same conduit as a power line cable, whereas there is no such restriction for optical fiber.

Hence in embodiments some or all of the optical fiber of the downlink distribution network may be formed in a same conduit or conduits as one or more power lines arranged to power one or more of the luminaires, the modulator unit and/or one or more other components.

In some cases, whilst the communication via the optical fiber is at the speed of light and therefore practically instantaneous for the present purposes, phase differences may still be introduced if the luminaires themselves are of different types that introduce different degrees of delay between the receipt of the modulated waveform from the fiber and the rendering of the waveform in the emitted light. This is not necessarily so in all possible implementations (e.g. the luminaires in the group could all be the same model), but in some cases the luminaires in the group may include different electronics in their optical receivers, injector circuits, driver circuitry and/or illumination elements, which may incur different degrees of delay in rendering the downlink signal. E.g. consider the case where the illumination element in each luminaire is an LED-based lamp, each lamp comprising one or more LEDs (e.g. arranged in a string or array), but different ones of the lamps in different luminaires employ LEDs comprising different phosphors. These will experience different excitation delays in rendering the signal. Also, when the signal instances from neighboring luminaires are received by the user device from slightly different angles, they will travel a different length physical path. Again this will lead to phase differences.

The inventors have recognized that light-based communications such as VLC can remain robust against these phase differences, and hence the issue need not be a barrier to the use of an upstream central modulator. With radio frequency (RF) communications, spectrum is limited and signals are typically shifted up to a high frequency carrier modulation for transmission. For light-based communications on the other hand where range is limited to, e.g., the order of magnitude of a room, there is less constraint on spectrum and hence no need to up-convert. In any case, slow-reacting LEDs (compared to EM antennas) are not capable of high frequency carrier modulation. Hence light-based communications and especially VLC typically use baseband modulation, whereby the modulation frequency is much lower than the carrier frequency. The inventors have recognized that in optical communication in which time-varying "photon densities" are used to embed data, the wavelength of the carrying light wave (400-700 nanometers) is not relevant to determine wave cancellation, but rather the distance and/or type of circuitry that a single bit traverses during its symbol duration. Modulation rate for VLC typically corresponds to a symbol wavelength in air of the order of 30 m or at least multiple meters (where wavelength for the present purposes means the traveling distance covered by a single symbol), whereas the inventors have identified that the phase difference between luminaires that give strong contributions at the receiving device will tend to correspond to no more than about 1 m. Larger path differences may occur from luminaires further away, but then the signal strength difference will be such that the signal instance(s) from the immediate vicinity of the receiving device will be dominant. This is further facilitated by an optical power loss of distance to the power four.

Hence in embodiments the downlink signal may have a symbol wavelength in air when embedded in the light of greater than 3 m. More preferably the symbol wavelength of the downlink signal in air when embedded in the light is greater than 10 m. In some embodiments the symbol wavelength of the downlink signal in air when embedded in the light is greater than 30 m. For instance, the phase difference between any pair of luminaires in the group may correspond to no greater than 10 degrees, or no less than 10% of the symbol wavelength of the modulation.

The above consideration regarding phase differences do not only hold for the downlink, but also for the uplink (to be discussed shortly), where signals from one user device arrives via multiple receiving nodes.

Note also however that the symbol wavelength of the downlink and/or uplink signals can also be made lower (i.e. higher data rate) if other measures are taken to mitigate the effects of possible phase differences, such as using luminaires and/or sensor units with substantially similar electronics so that the delays introduced by these components are substantially the same between different nodes.

Robustness against phase differences can also be improved by employing orthogonal frequency division multiplexing (OFDM) to form the modulated waveform, preferably at least on the downlink. I.e. the modulated waveform as generated at the upstream modulator, transmitted over the fiber and emitted by the luminaires, is modulated according to an OFDM scheme. OFDM is a known technique which is inherently robust against phase differences between different superimposed received instances of the same signal. Using OFDM it is even tolerable for some frequencies to cancel out.

In particular, OFDM further mitigates the effect of phase differences, and is inherently robust against multipath propagation. Phase cancellations in OFDM lead to the loss of signal in a particular subset of its subcarriers, but this is compensated by redundancy (typically error correction coding, Coded-OFDM) along the (remaining) subcarriers. Combined with the use of high speed optical links as in the present disclosure, wave cancellations can be largely avoided and so less redundancy is needed, and the signal processing can be simpler (including channel estimation, carrier bit loading, etc.). Note however that the scope of the present disclosure is not limited to OFDM and other modulation methods such as PAM may alternatively be used.

Hence in embodiments the modulator may be configured to generate said modulated waveform according to an OFDM scheme, such that the modulated waveform as transmitted over the optical fiber of the downlink distribution network takes the form of an OFDM modulated waveform.

In further alternative or additional embodiments the system or at least the downlink subsystem may be divided into a plurality of spatial regions optically separated from one another by opaque partitions, each of said regions comprising a respective set of data-emitting luminaires emitting light embedded with data, said group of luminaires being the set of data-emitting luminaires in one of said regions and said downlink signal communicating the respective data for that region; wherein within each given one of said regions only the same data may be embedded in any light emitted into that region, but the light emitted in different ones of said regions may be embedded with different data.

By providing multiple luminaires emitting the same signal per region, but ensuring opaque division between regions, this advantageously avoids "grey areas" between overlapping illumination from different luminaires where there would otherwise be interference. For instance each of the regions may be a different respective room of a building, in which case the partitions are walls. Thus each room forms a different respective cell of the downlink subsystem, which is shielded from adjacent cells by the pre-existing features of the building. For instance in an office building the different rooms may be or include one or more offices, a corridor between such offices, a meeting room, and/or a canteen or break room, etc.; or in the home the different rooms may be or include a living room, kitchen, one or more bedrooms, etc.

According to another aspect disclosed herein, there is provided a system, wherein the group of luminaires of the downlink system is the same group of luminaires as used in the uplink system. The user device may also be the same user device.

In other words, according to one aspect there may be provided illumination system arranged for optical communication, the illumination system comprising a downlink subsystem and an uplink subsystem, wherein the uplink and downlink subsystems comprise the following. The downlink subsystem comprises: a group of luminaires; a modulator unit for controlling the group of luminaires to emit a downlink signal for detection by a user device; and a downlink distribution network connecting the modulator unit to each of the luminaires in said group; wherein the modulator unit comprises a modulator configured to generate a modulated waveform corresponding to the downlink signal, and is arranged to transmit the modulated waveform to each of the luminaires in said group over the downlink distribution network; each of the luminaires in said group comprises a lighting element for emitting light, and driver circuitry for driving the lighting element with a drive current powering the lighting element to emit said light; and each of the luminaires in the group is arranged to receive the same modulated waveform from the modulator over the downlink distribution network, and further comprises a signal injector arranged to inject the modulated waveform into said drive current in order to cause the downlink signal to be embedded in the emitted light. The uplink subsystem comprises: a demodulator unit; a group of sensors each for sampling a respective instance of an uplink signal transmitted wirelessly from the user device; and an uplink distribution network arranged to supply the respective instance of the uplink signal from each of the sensors to the demodulator unit; wherein the demodulator unit comprises an adaptor arranged so as, based on a measurement of a respective received signal strength of each of the instances of the uplink signal, to apply a respective weight to each instance in dependence on the respective measurement of received signal strength, and to combine said instances of the uplink signal following the application of said weights, thereby producing a combined signal; and the demodulator unit further comprises a demodulator arranged to demodulate the combined signal. Preferably the downlink distribution network is an optical fiber network, i.e. the modulated waveform being distributed from the modulator to the luminaires via optical fiber.

The uplink distribution network and the downlink distribution network (the optical fiber distribution network used to distribute the modulated waveform to the luminaires on the downlink) could be implemented as different channels of the same optical fiber network. For instance they may be formed from different parallel fibers or bundles of fibers running through the same conduit or conduits, or more generally along the same path or paths. As another example the uplink and downlink distribution networks could be implemented by different time-division duplexed channels on the same physical fiber or fibers. Alternatively it is not excluded that separate distribution networks could be used for the uplink and downlink, e.g. optical fiber for the downlink and coaxial cable or power line communications for the uplink.

Preferably each sensor is incorporated in or co-located with a different respective one of the luminaires in the group. Alternatively the sensors could be interspersed amongst the luminaires of the group, serving the same region of space that is illuminated by the luminaires (e.g. mounted on the ceiling and/or walls at positions in between the luminaires in a given room). In the latter case there need not necessarily be one sensor per luminaire.

Either way, in embodiments the uplink cells are preferably the same as the downlink cells, e.g. each cell being a different respective room of the same building.

By employing a centralized modulator to avoid duplication of modulator logic, combined with an optical fiber distribution network to avoid significant phase shifts, and/or OFDM to improve robustness against phase shifts, this enables an efficient and reliable system in which multiple luminaires within a certain region can emit the same signal and hence all form a same cell from a downlink perspective. Further, it is typically convenient that the division of a network into cells for the purpose of the uplink is the same as for downlink. By transitioning between luminaires at the physical layer rather than handing over at the protocol layer, this avoids the need for handover on the uplink as well. Thus working together these features enable a duplex cell spanning multiple luminaires, e.g. all the luminaires in a room. This enables faster transitions by doing away with handover within the region in question, e.g. in the same room.

Single frequency networks are known in radio broadcasting, i.e. for the case of one-way radio transmission of data that is intended for multiple recipients. Yet in the presently disclosed system its use is extended for two-way communication to multiple users with different data per user. It is recognized herein that optical is different than radio cellular systems in the overlap between cells, the radius of cell sizes and the availability of alternative radio frequencies in neighboring cells. In radio, a handover to a neighboring cell, using a different radio is attractive, because it limits the use of radio bandwidth area. Yet in optical wireless communication (e.g. VLC), communication is in baseband, and alternative channels with other carrier frequencies are not available; hence allowing multiple lamps to emit the signal helps in OWC, and does not have the disadvantages of wasting bandwidth that could be reused otherwise. OWC systems also tend to have many areas with overlapping contributions for multiple luminaires. In these area the reception from multiple luminaires can boost the signal (if signal add constructively thus without large phase differences (see discussion above—in the uplink, the same issues of phase coherency and low delay as discussed previously in relation to the downlink also apply). Further, in very small cells with radii of a few meters or less, regular handover schemes would lead to excessive handover rates.

In yet further embodiments the uplink signal may be modulated according to an OFDM scheme comprising different uplink subcarriers, and the demodulator unit may comprise a phase shifter arranged to introduce a delay diversity between different ones of the uplink subcarriers; and/or the modulated waveform of the downlink signal may be modulated according to an OFDM scheme comprising different downlink subcarriers, and the modulator unit may comprise a phase shifter arranged to include a delay diversity between different ones of the downlink subcarriers.

BRIEF DESCRIPTION OF THE DRAWINGS

To assist understanding of the present disclosure and to show how embodiments may be put into effect, reference is made, by way of example only, to the accompanying drawings in which.

DETAILED DESCRIPTION OF EMBODIMENTS

Figure 1:
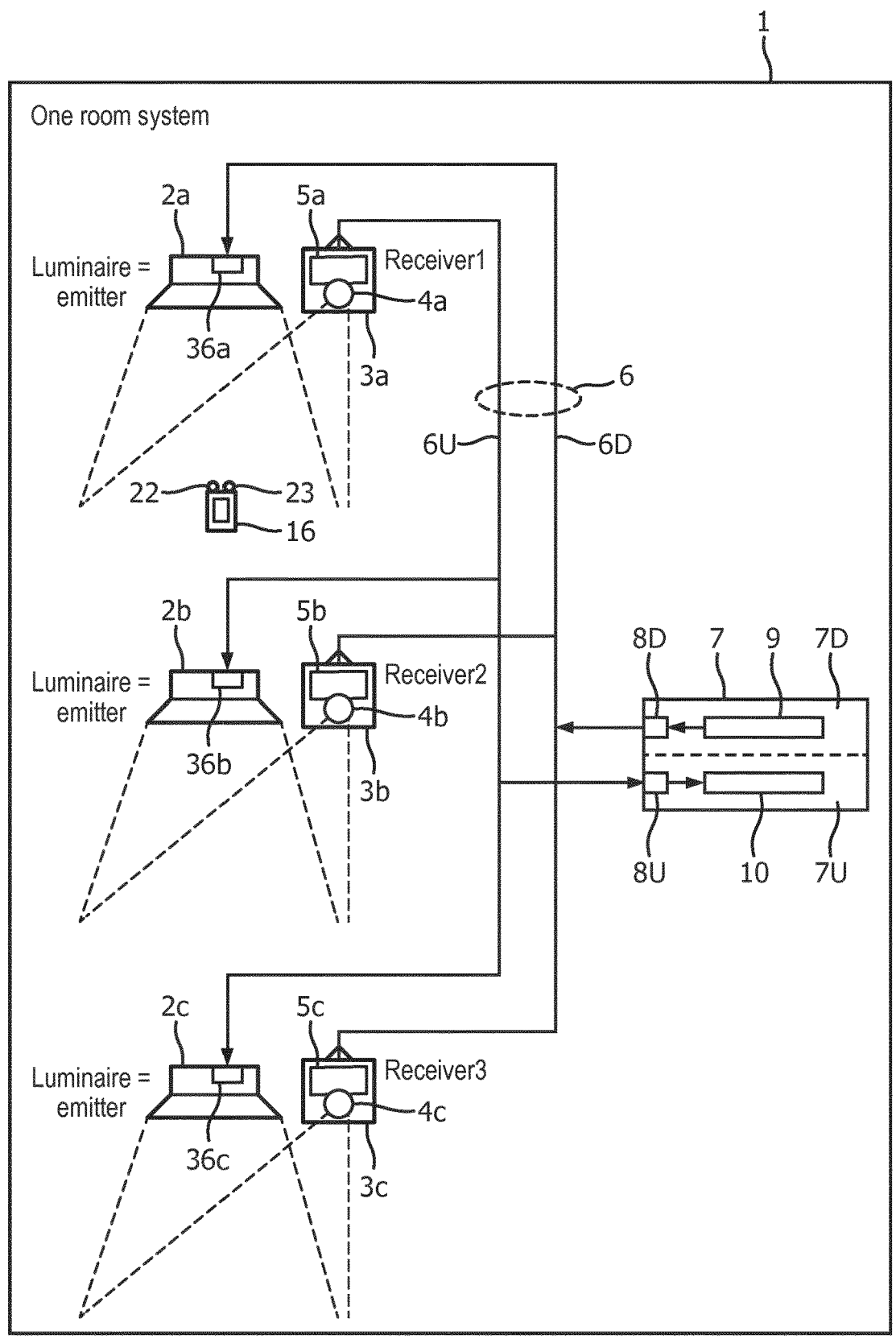
FIG. 1 is a schematic block diagram of an illumination system that also enables duplex communications.

The following describes a system for creating a large area of optical wireless reception with several receivers connected to a common optical wireless communication system. The optical wireless communication system comprises: a transmitter part with a single modulator connected by multiple plastic optical fibers to different luminaires, and a receiver part which includes several feedback channels to a common demodulator. All these elements may be implemented for example in the same room. The aim is to manage the overlapping between nodes and also negate the need for handover between them.

On the downlink the system comprises several emitters but they all send the same signal.

On the uplink, the system comprises several emitting user devices sending different signals but not at the same time most cases (TDMA) except for polling. The user device may for example a user terminal such as a laptop or tablet having a dongle plugged in enabling the user device to communicate via optical wireless.

On the downlink, one issue to address is the coverage of a given area by a wireless optical communication system using several light sources without interference issue between two adjacent non synchronized light sources. Another consideration is the cost of optical wireless communication deployment.

Embodiments disclosed herein provide a wireless optical communication system that ensures a relatively large area of coverage by employing multiple light sources to emit the same signal, thus solving the handover issue within that area (i.e. no need for handover at the protocol layer). Preferably the regions of combined coverage—i.e. cells—correspond to rooms or other divisions separated by opaque partitions, such that optical interference between cells is blocked by the walls or other such partitions. Embodiments also provide a device which allows the driving of several light sources with one modem whilst guaranteeing no significant phase shift between the instances of the data signal coming from these different light sources.

Such a system may advantageously avoid "grey" zones between two light sources where data reception could be bad due to SNR degradation (interference). In embodiments there is also cost reduction thanks to the use of one wireless optical modem for several light sources. Further, in embodiments plastic optical fiber (POF) or glass optical fiber (GOF)

is used as the means to convey the signal from the modulator to the luminaires, thus combining POF or GOF with wireless optical communication (e.g. LiFi). As a result long distance cabling with different lengths may be used between wireless optical modem and light sources, and there is little or no bandwidth degradation even with long length connections. Embodiments may employ additional phase shift control.

An issue addressed on the uplink is that there are multiple receivers for a given transmitting user device (there being at least a user device, but not necessarily more than one). In embodiments the multiple receivers are included in or around different luminaires in the ceiling.

The disclosed uplink subsystem combines the received information signals sensed by multiple receivers (e.g. photodiodes if the uplink signals are transmitted from the user device by infrared). One way to do so, facilitated by the phase similarity of the dominant signals, would be to sum all signals that come from all the receiving sensors (e.g. all from luminaires in the room in the case where there is one uplink sensor per luminaire). A drawback of this approach however is that it would also sum the noise of each receivers, deteriorating the SNR. That is, simply combining all received signals with a summing amplifier would increase the noise floor and deteriorate SNR. The solution at the other extreme would be that all signals are fully demodulated and decoded locally in the receiver node, and then only the decoded digital signals that are found to carry the data payload are sent to a central node. Yet this has the disadvantage that it incurs excessive signal processing: each receiving node at each individual position needs to fully execute the processing for reception, Orthogonal Frequency Division Multiplexing (OFDM), Fast Fourier Transform (FFT), channel estimation, error correction, etc. There would be an increased cost of optical wireless communication deployment if one did not combine signals but instead used separated channels with separate ADC inputs. Moreover, to first make hard digital decisions and then combine would lead to lower performance (bit errors are more likely) compared to first coherently combining analogue signals.

It would be desirable to provide an uplink subsystem that has better or at least comparable performance to a system with only one emitter and one receiver, which instead uses multiple receivers but avoids the accumulation noise from nodes that do not see a signal with good SNR. Preferably the system uses the signal at multiple receivers to boost the amplitude of the joint signal, such that signals add coherently while the noise adds incoherently. To do this the disclosed uplink subsystem uses (near) optimal combinations of only those signals having at least a certain received signal strength, e.g. compared to a noise floor. The subsystem separately controls each receiver signal, and applies "smart" summation of analogue received signals with an optimized SNR mechanism, e.g. based on preamble acknowledge phase sniffing of the activity state under a given receiver.

Thus there is provided a device which enables a wireless optical communication system with large area coverage, by combining received signals from several IR receivers with one modem, thus solving handover issue, and avoiding "grey" zones between two IR receivers where data reception could be bad due to SNR degradation (increase noise floor). Embodiments may optimize noise floor monitoring activity of each receiver. Further embodiments may optionally use preamble sequences for activity sniffing.

FIG. 1 illustrates an example of a lighting system (i.e. illumination system) in accordance with embodiments disclosed herein.

The system comprises a plurality of luminaires 2 arranged to illuminate an environment, i.e. a space occupiable by at least one user. The environment could be an indoor environment such as a building or a particular room of a building, or an outdoor environment such as a park or garden, or a partially covered space such as a stadium, or the interior of a vehicle such as a ship or train, etc.; or any combination of such spaces. Three luminaires 2a, 2b, 2c are shown purely for illustrative purposes. The luminaires may take any of a variety of traditional or non-traditional forms. For example some or all of the luminaires 2 may be mounted on the ceiling or wall of a room, or may be free-standing luminaires. Or some or all of the luminaires may be incorporated into surfaces or items or furniture.

The lighting system further comprises an uplink subsystem and a downlink subsystem, enabling duplex communication of data to and from a user device 16 via the illumination system. For instance this may enable the user device 16 to access a remote network or other data service via the lighting system, e.g. to access the Internet via the lighting system.

To implement the downlink, each luminaire 2 is arranged to include an embedded signal modulated into the visible illumination which it emits. Such technology is often referred to as VLC (visible light communication), or "coded light".

The symbols of data in the downlink signal are represented by modulating any suitable property of the emitted light. For VLC the light is modulated according to a baseband modulation relative to the frequency of the EM radiation itself, i.e. a low frequency compared to the carrier. This can be done by directly modulating data symbols into the amplitude or intensity of the light, e.g. by amplitude shift keying, or pulse position modulation. Alternatively some schemes modulate an artificial carrier waveform into the light (still at low frequency compared to the EM frequency of the light itself) and then modulating a property of this carrier such as its frequency or phase, i.e. using frequency shift keying or phase shift keying. Either way the symbol wavelength of the signal is long compared to that of the light itself. Visible light is wavelength 390-700 nm, whereas the fundamental symbol length of the data (smallest unit of the modulation scheme) over the air channel is typically of the order of meters, e.g. greater than or equal to 3 m, greater than or equal to 10 m, or greater than or equal to 30 m. Nonetheless, preferably the modulation frequency is high enough to be invisible to the human eye, or at least so that any visible artifacts are tolerable. Also shorter symbol wavelengths are not excluded.

The modulation may involve a coding scheme to map data bits (sometimes referred to as user bits) onto such channel symbols. To avoid visible flicker, preferably a DC-free encoding scheme is used, i.e. having a power spectral density that goes to zero at 0 Hz. An example is an OFDM signal without the DC codes and possibly also some lower frequency subcarriers being removed.

The embedded downlink signal, embedded in the emitted illumination, is detected by a light sensor 22 on the user device 16. The detected embedded waveform is demodulated and decoded by a suitable demodulator and decoder of the user device 16 (not shown). The user device 16 may take the form of a mobile user device such as a smartphone, tablet or laptop computer, or even a wearable device. The light sensor 22 may for example take the form of a photocell (point sensor) or a camera, which could be a global-shutter camera or a rolling-shutter camera which captures each frame line-by-line. The light sensor 22 may be incorporated in the body of the user device 16 or plugged into an external socket of the user device, e.g. as part of a dongle. The demodulator and decoder of the user device 16 may be implemented in software, hardware or any combination thereof. They may be implemented on the user device 16 itself, or on a local or remote device to which the user device 16 connects (e.g. a local host computer to which it connects by a cable or local wireless network, or a remote server to which the user device 16 connects via a wide area network such as the Internet); or any combination of such approaches.

On the uplink each luminaire 2 is associated with a respective receiver unit 3, in embodiments preferably an infrared (IR) receiver. Preferably each receiver unit 3 is incorporated in the body of its respective luminaire 2, e.g. in the same housing, or is at least co-located with its respective luminaire 2, e.g. mounted next to it on the ceiling or wall. Alternatively it is not excluded that the receiver units 3 are located elsewhere, but still serving the same approximate region as the VLC coverage from the luminaires. Also there need not strictly be the same number of receiver units 3 as luminaires 2. For instance the receiver units 3 would be mounted on the ceiling interspersed between some or all of the luminaires 2, which may also be mounted on the ceiling. However, integration or at least co-location of the receiver units 3 in the luminaires 2 may be preferred to ensure the most consistent coverage between the uplink and the downlink. The following will be described in terms of such embodiments.

The user device 16 comprises an emitter 23 for wirelessly emitting an uplink signal to be received by one or more of the receiver units 3. Preferably this is an IR emitter, e.g. formed from one or more IR LEDs, for sending the signal by infrared. The emitter 23 may be incorporated in the body of the user device 16 or plugged into an external socket of the user device, e.g. as part of a dongle. The uplink signal it emits originates from an encoder and modulator of the user device 16 (not shown), which may be implemented in software, hardware or any combination thereof. Like the demodulator and decoder of the user device 16, its modulator and encoder may be implemented on the user device 16 itself, or on a local or remote device to which the user device 16 connects (e.g. a local host computer or a remote server), or any combination of such approaches.

Each receiver unit 3 comprises a respective sensor 4 for sensing the wireless signal emitted on the wireless uplink channel by the user device 16. Each receiver unit 3 also comprises a respective optical transmitter 5 for sending the waveform as sensed by the respective sensor 4 to a demodulator 10 to be demodulated (and then decoded by a decoder, not shown). This will be discussed in more detail shortly.

Figure 2:
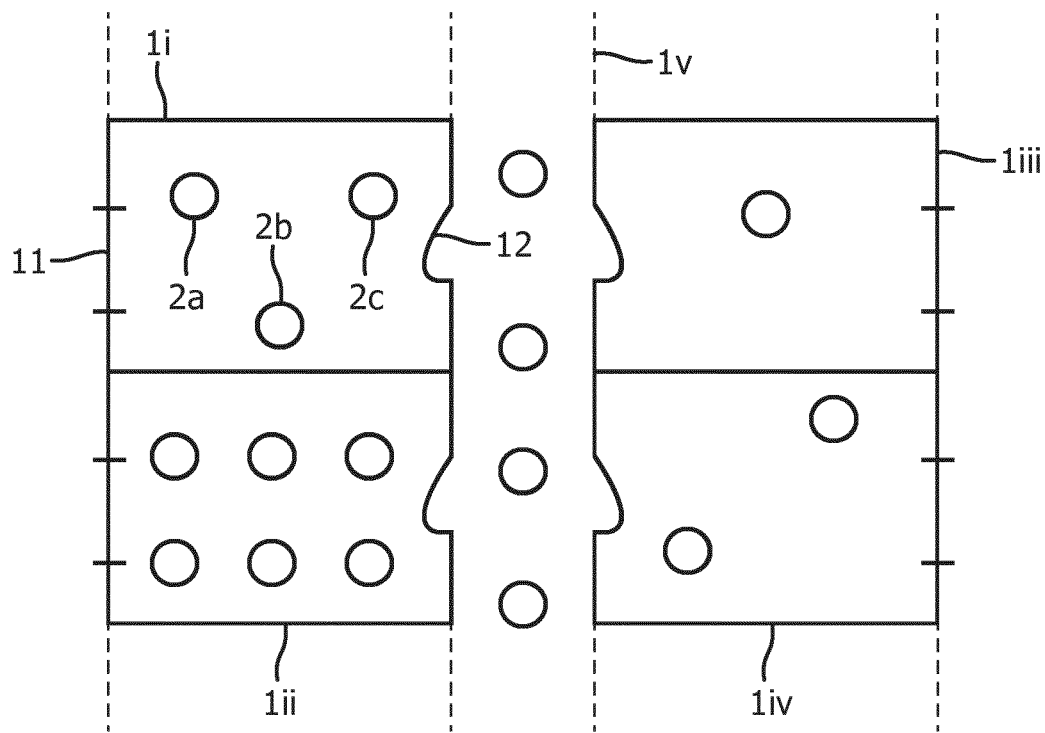
FIG. 2 is a schematic plan view of a plurality of cells of the system.

Also referring to FIG. 2, the environment is divided into one or more cells 1, each served by a respective group of the luminaires 2. Five cells 1*i* . . . 1*v* (e.g. rooms) are shown in FIG. 2 for purely illustrative purposes, with one of the cells for example being served by group consisting of the luminaires 2*a*, 2*b* and 2*c* of FIG. 1, but it will be appreciated that various other configurations are possible.

As will be discussed in more detail shortly, the group of luminaires 2 in each cell 1 are arranged to all emit the same downlink signal at the same time (subject to small but tolerable phase shifts, and potentially other insubstantial variations). Thus all the luminaires act together to provide the continuous downlink service of a single cell, avoiding the need for the user device 16 to perform a handover operation as it moves from being nearby one luminaire 2 to another luminaire 2 within the cell 1. Further, the luminaires 2 in a given cell 1 are also arranged to act together in receiving the uplink signal from the user device 16, thus together providing the continuous downlink service of a single cell, again avoiding the need for handover within that cell 1.

N.B. "Handover" as used herein refers to the protocol layer operations involved in handing over from one logical serving entity to another. According to the present disclosure, within a given cell 1 served by multiple luminaires 2, the portable user device 16 does not have to perform a handover (i.e. at the protocol layer) as it moves from being served by one of the luminaires 2 in that cell 1 to another such luminaire 2. Instead, the system simply allows it to transition from one luminaire 2 to another at the physical layer, whilst at the protocol layer the multiple luminaires 2 of a given cell appear as one single, continuous coverage area of a single logical serving entity. This allows for a smooth and fast transition from using one luminaire 2 to another within a relatively large area compared to the coverage area of a single luminaire 2, and hence provides smoother coverage over a larger area than conventionally possible for optical combinations.

Preferably the cells are arranged so as to correspond to optically segregated physical subdivisions of the wider environment, i.e. regions substantially separated by optically opaque partitions such as walls. For instance the cells may be different rooms of the same building. E.g. in an office building the rooms in question may be one or more corridors, individual offices, meeting rooms, receptions, canteens, and/or break rooms, etc. Or in the home the rooms in question may be any two or more of: a hall, landing, lounge (living room), kitchen, one or more bedrooms, laundry room, garage, etc. As another example, some or all of the cells could be subdivisions created by internal partitions within a room, such as office cubicles; perhaps with another cell in the corridor outside that room, etc. Note: it is not excluded that the opaque partitions (e.g. walls) could include some gaps such as windows 11 and doors 12, which pass only a tolerable amount of light interference (whether from adjacent cells 1 or other sources such as daylight).

Preferably the uplink cells are the same coverage areas as the downlink cells (though strictly that does not have to be the case in all possible implementations).

Returning to FIG. 1, for each cell 1, the system comprises a modem device 7 shared by all the luminaires 2 in that cell. The modem device 7 comprises a modulator unit 7D and a demodulator unit 7U. Further, the system comprises a distribution network 6 connecting the modem device 7 to the luminaires 2 and their sensor units 3. Preferably the distribution network is formed from optical fiber, and most preferably plastic optical fiber which is most easily installed by technicians. However glass optical fiber (GOF) is also not excluded.

The distribution network 6 comprises a downlink distribution network 6D for sending signals from the modulator unit 7D to the luminaires 2, and an uplink distribution network 6U for sending signals from the sensor units 3 to the demodulator unit 7U. The downlink distribution network 6D and uplink distribution network 6U may be different channels of the same network, e.g. different parallel fibers or parallel bundles of fibers running along the same path or through the same system of conduits, or even different time-division duplexed channels implemented through the same physical or fiber or fibers. Alternatively it is not excluded that the downlink and uplink distribution networks 6D, 6U could simply be two completely separate networks.

The modulator unit 7D comprises a modulator 9 for generating a modulated waveform to be embedded in the light emitted by the luminaires 2 in a given cell 1. The modulated waveform represents an encoded signal generated by an encoder (not shown), encoding data ultimately originating from any data source (also not shown), e.g. a service being accessed by an application running on the user device 16. The modulator unit 7D further comprises an optical transmitter 8D for sending signals over the downlink distribution network 6D to the luminaires 2 in the cell 1. Each of the luminaires 2 comprises an optical receiver 36 for receiving signals over the downlink distribution network 6D from the central modulator unit 7D, which is common to all the luminaires 2 in the same cell 1.

On the downlink the modulated waveform generated upstream by the modulator 8 is sent from the optical transmitter 8D of the modulator 7D, and from there distributed to all the luminaires 2 in the cell 1 via the downlink distribution network 6D. This waveform is received by the optical receiver 36 in each luminaire 2. Each luminaire 2 is configured to embed this received waveform in the light emitted by that luminaires 2. The optical transmitter 8D may comprise a separate respective optical transmitter element each arranged to send, via a different respective fiber 6D, the instance of the uplink signal to the optical receiver 36a, 36b, 36c . . . of each respective one of the luminaires 2 in the cell 1. Alternatively a multiplexed approach is not excluded, e.g. whereby the different signal instances are time division multiplexed over the same physical fiber 6D.

The demodulator unit 7U comprises a demodulator 10 for demodulating a modulated waveform obtained by combining the waveforms sensed from a plurality of the sensor units 3 in a given cell 1. The demodulator unit 7U also comprises an optical receiver 8U for receiving signals over the uplink distribution network 6U from the sensor units 3 in the cell 1. Each sensor unit comprises an optical transmitter 5 for sending these signals to the demodulator unit 7U over the uplink distribution network 6U. On the uplink, the waveform sensed by each of the sensor units 3 is sent from the optical transmitter 5 over the uplink distribution network 6U, to be demodulated by the central demodulator unit 7U which is common to all the luminaires 2 in the cell 1. The multiple received waveforms are received by the optical receiver 8U of the demodulator unit 7U, and then selectively combined (as will be discussed shortly) before being passed to the demodulator 10 for the combined waveform to be demodulated, before being passed to a decoder (not shown) for decoding. Ultimately the decoded data is passed to an application running on a server connected to the network (e.g. a local server, or a server on the internet).

Each of the modulator 9 and demodulator 10 may be implemented in software or hardware or any combination thereof. In embodiments the modulator 9 and demodulator 10 are implemented as portions of code stored in the same physical memory unit of the modem device 7 and arranged to run on the same physical processor of the modem device 7. Similar comments apply in relation to encoder and decoder (not shown).

Figure 3:
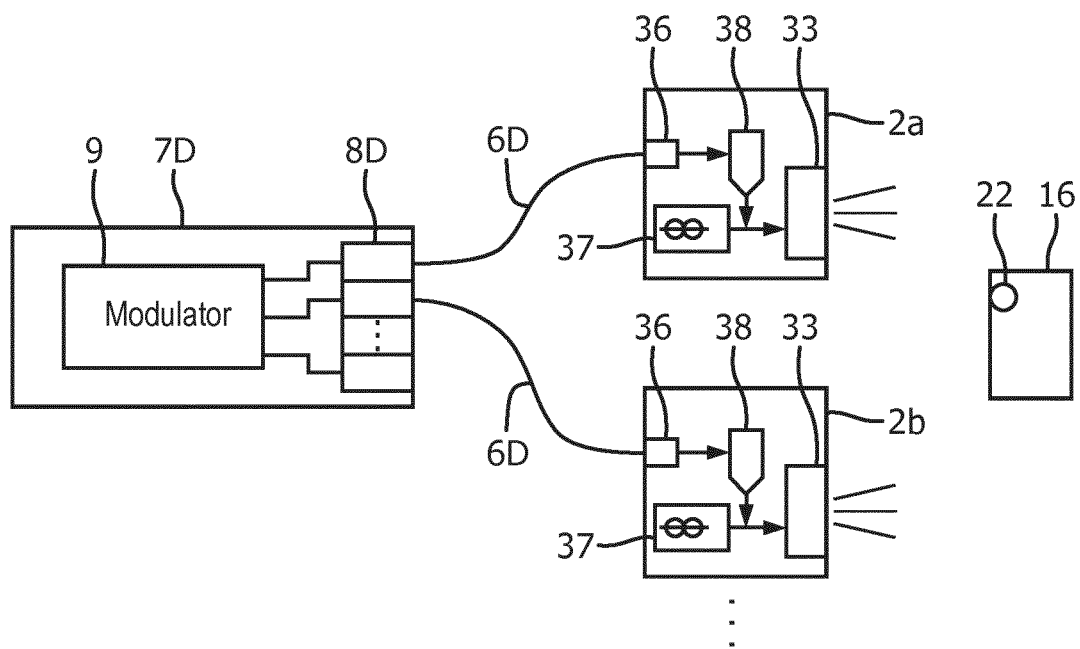
FIG. 3 is a schematic block diagram of a downlink subsystem.

FIG. 3 illustrates more detail of the luminaires 2 for transmitting on the downlink. Each luminaire 2 comprises an illumination element 33 i.e. lamp, for emitting visible illumination to illuminate a space corresponding to the respective cell 1; and driver circuity 37 for generating a steady current with which to drive the illumination element to emit its illumination. The illumination element 33 preferably comprises an LED-based lamp comprising one or more LEDs, typically a plurality of LEDs arranged in a string or array. Other forms of lamp are also potentially possible, e.g. filament bulb, though these would have much lower possible modulation speeds and shorter lifetimes than LEDs. The drive current is generated by the driver circuitry 37 to have a constant current level, subject to the modulations to be included based on the waveform received from the modulator 9 via the fiber 6D (See below). N.B. If the luminaire 2 is dimmable, "constant" means constant for a given dim level, i.e. constant on the scale of the VLC modulations, or in other words pseudostatic.

To embed the signal, each luminaire also comprises a VLC injector 38 arranged to receive the waveform sampled from the fiber 6D by the optical receiver 36 (ultimately originating from the modulator 9), and to inject this waveform into the otherwise-constant current generated by the driver circuitry 37. For example, this may be by means of addition or multiplication of a current linearly proportional to the received waveform with the constant drive current generated by the driver circuitry 37.

Figure 9:
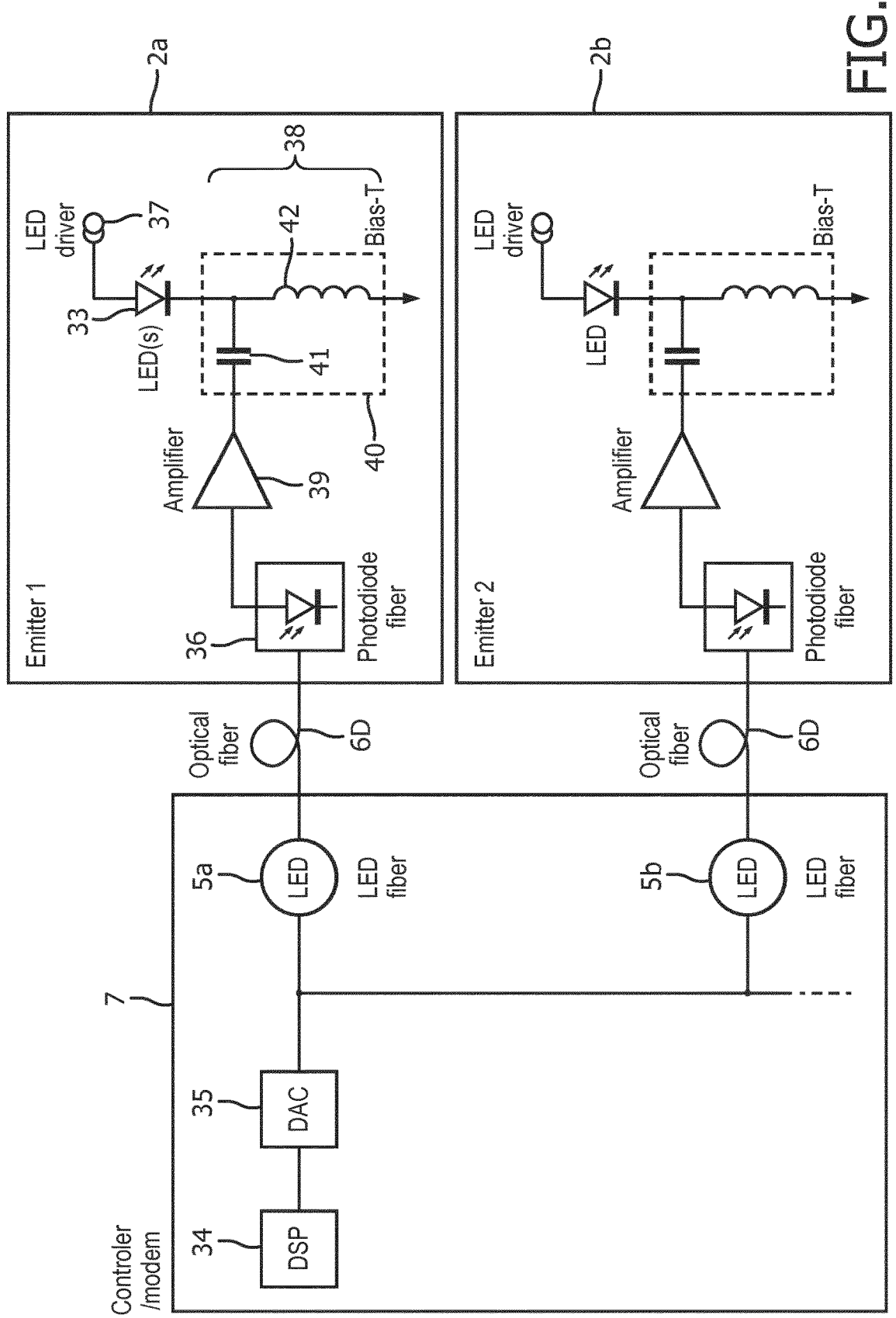
FIG. 9 is another schematic diagram of a downlink system including a schematic diagram of a design for the signal injectors in the luminaires.

FIG. 9 illustrates further details of an example implementation of the current injection.

When modulating a signal on LEDs, this involves combing AC data with a DC current. One way to do this is by means of a "bias T" 40: a simple circuit comprising a capacitor 41 and DC coil 42. The waveform sampled by the optical receiver 36 is passed through an amplifier 39 which outputs a current proportional to the sampled waveform. This varying current is then passed to one of the terminals of the capacitor 41 of the bias T circuit 40. The coil (inductor 42) of the bias T circuit 40 is connected in series with the illumination element 33—in this case an LED string or array. I.e. so the constant current generated by the driver 37 is passed through the LEDs 33 and the coil 42 in series. The other terminal of the capacitor 41 (the other input than that to which the AC current waveform is input) is connected to the junction between the LEDs 33 and the coil 42. The effect is that the otherwise-constant current generated by the driver 37 is varied by the AC current received from the amplifier 39, in proportion to the shape of the waveform received by the optical receiver 36. I.e. both the AC and DC current components flow through the LEDs 33.

Note however that this is just one example. Other possible methods include, for example, controlling the total current (AC+DC) through the LEDs 33 via a transistor such as a FET.

FIG. 9 also shows the digital signal processor 34 of the modem 7, on which the modulator 9 and demodulator 10 may be run; and a digital-to-analogue converter 35 for converting the digital version of the modulated waveform, as output by the modulator 9, to analogue form for transmission from the optical transmitter over the fiber 6D.

By generating the modulated waveform upstream at a central modulator 9 common to multiple luminaires 2, this advantageously avoids duplication of complex and power-hungry modulators in each luminaire 2, and also enables each luminaire 2 in the group to emit the same signal at once without the need for a complex synchronization mechanism.

An arrangement employing a centrally-generated modulation waveform could potentially be vulnerable to phase shifts. I.e. different instances of the same modulated waveform could experience different paths prior to emission by the different luminaires 2, and therefore different relative phase shifts. Hence destructive interference could be created between the different instances of the VLC signal emitted by nearby luminaires 2. However, by choosing optical fiber as the medium for the distribution network 6 (instead of, say, old-fashioned or poor quality coaxial cable), phase differences due to different lengths cable of can be eliminated since transmission at the speed of light is practically instantaneous (modern, good quality coaxial cable can come close and is an alternative in some embodiments, but optical fiber is preferred to minimize phase shifts). Some phase shifts may be introduced by the electronics in the luminaires 2, e.g. due to the optical receiver 36, injector 38, or the phosphors in the LEDs 33. If luminaires 2 of different types are used, e.g. different models or colors, then some relative phase differences may be introduced between the different instances of the same VLC signal. However, it is identified herein that such phase shifts will only be of the order of 1 m. Whereas the VLC signal may have a symbol wavelength (e.g. fundamental symbol period) of at least 3 m, and preferably greater than 10 m, or even greater than 30 m. Note that the wavelength or symbol wavelength for the present purposes refers to the length of a fundamental channel symbol in air.

However, it is also not excluded that shorter symbol wavelengths (higher data rates) can be used, especially if other measures are taken to reduce phase differences or increase robustness against phase differences. For instance, one measure to reduce phase differences is to use substantially identical components in the relevant electronics of the luminaires 2 and/or sensor units 3, or at least components that incur substantially the same delay. That is, on the downlink, components which incur the same delay between receiving the waveform of the downlink signal and rendering it; or on the uplink, components which incur the same delay between sensing the uplink signal and outputting it into the uplink distribution network 6U. In this case, assuming also a practically instantaneous distribution network 6 as with optical fiber, the only source of relative phase shifts is the physical path differences travelled by the signals through the air. In a dense network of nodes where the user device finds itself closely beneath two or three luminaires 2 (for the downlink) or sensor units 3 (for the uplink), then due to the geometry of this (small physical path differences at high angles), these phase differences can also be quite small.

In embodiments, another alternative or additional measure to mitigate the effect of relative phase shifts is to use OFDM to generate the modulated waveform. OFDM in itself in itself is a known technique whereby the channel is divided into subcarriers and instead of sending N bits of a given signal sequentially, e.g. N=64, those N bits are transmitted on different subcarriers (note this is for a given signal for a given user—OFDM is not needed for multiple access, and time division may be used instead for that). Transmitting N bits at high rate in short succession means a short period and therefore a wide bandwidth, whereas transmitting N bits more slowly in parallel in different subcarriers keeps the channel to a more tightly constrained bandwidth. OFDM can also tolerate higher phase shifts than other modulation techniques such as phase amplitude modulation (PAM). In general the system works best if phase shifts are small, and for other modulation techniques such as PAM relative phase shifts should be small (<<90 degrees). But for OFDM it is even tolerable if some frequencies cancel out. Embodiments may use OFDM on the downlink and PAM on the uplink, though OFDM on the uplink is not excluded.

Note that OFDM in is original form is not suitable for optical baseband channels, that only transfer real non-negative signals. Hence by OFDM, it is meant herein any form of multicarrier modulation that allows the transmission of symbols each in a narrowband narrower than the overall bandwidth of the signal. For instance, optical variants may be used such as DCO-OFDM, ACO-OFDM, flip-ofdm, DMT based multicarrier signals, etc. Also OFDMA can first be up-modulated to a carrier frequency carrier, typically at a few ten of MHZ.

Figure 4:
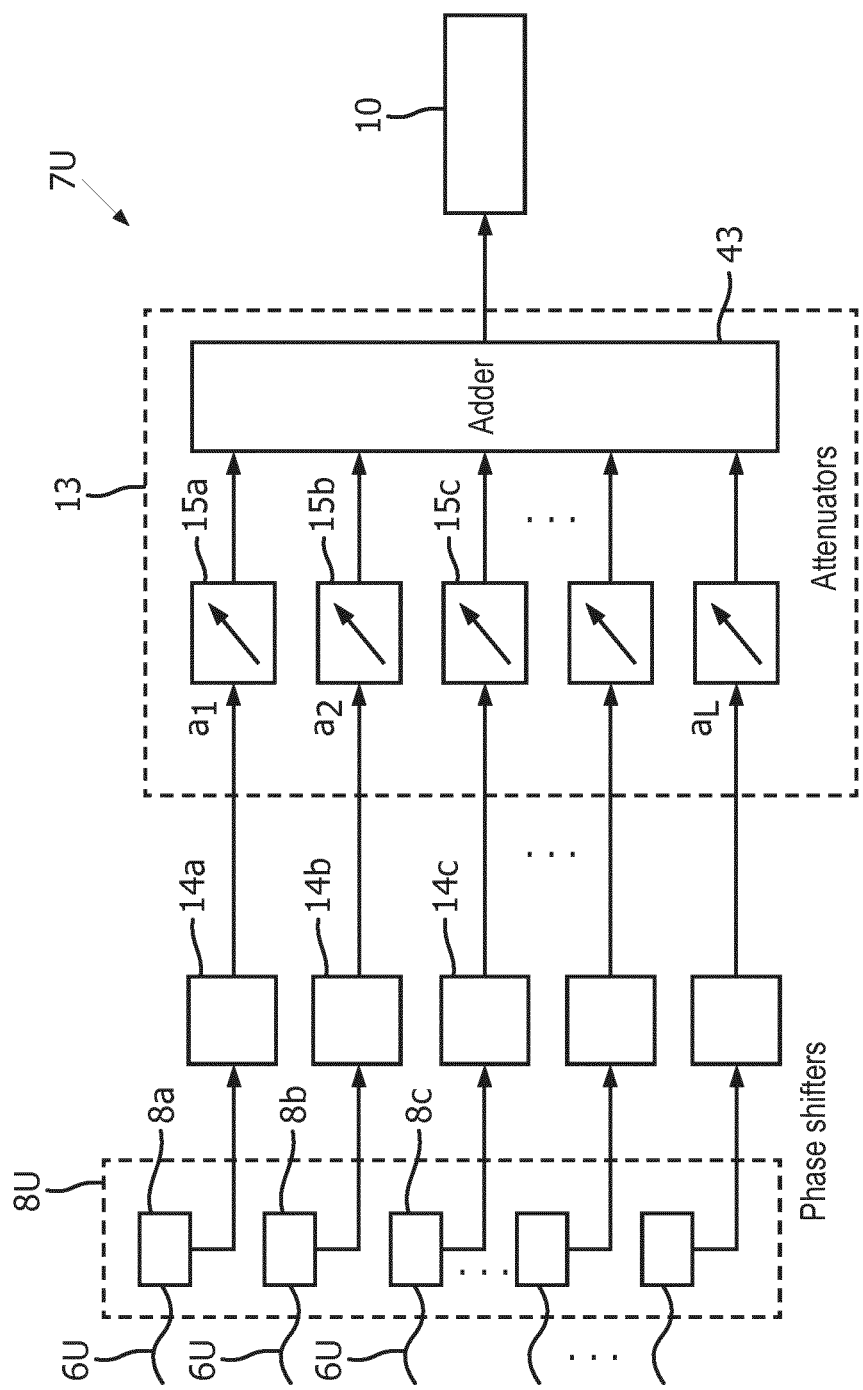
FIG. 4 is a schematic block diagram of an uplink subsystem.

FIG. 4 shows further details of the demodulator unit 7U of the modem device 7 according to embodiments of the present disclosure. The optical receiver 8U may comprises a respective optical receiver element 8a, 8b, 8c . . . each arranged to receive, via a different respective fiber 6U, the instance of the uplink signal from the user device 16 as sensed by a different one of the sensor units 3 in the cell 1. Alternatively a multiplexed approach is not excluded, e.g. whereby the different signal instances are time division multiplexed over the same physical fiber 6U. Either way, the modulator unit 7U comprises an adaptor 13 disposed between the optical receiver 8U and the demodulator 10. The adaptor 13 comprises an adder 43 (i.e. summation block), and a respective weighting block 15a, 15b, 15c . . . arranged to apply a respective gain (i.e. weight) a1, a2, a3 . . . to each different respective one of the signal instances received from the different respective sensor units 3. The weighted versions of these signal instances are then input to the adder 43 where they are combined, and the resulting combined signal is passed to the demodulator 10 to be demodulated.

The weights are determined based on the received signal strengths of the respective signal instances as received by the sensors 3. These may be measured by the adaptor 13, or alternatively they may be measured by the sensor 3 and indicated to the adaptor 13 (e.g. via the fiber network 6), based upon which the adaptor 13 may then determine the weights. The centralized approach wherein the weights are determined by the adaptor 13 has the advantage that knowledge of the TDMA time-slot allocation need not be distributed.

As yet another possibility, each sensor unit 3 may even determine its own weight and signal this to the adaptor 13 (e.g. via the fiber network 6), and the received weights are the applied at the adaptor 13. Alternatively, the sensor unit locally applies its weight, if the local sensor unit is agnostic of the TDMA schedule; such weighting could be based on an automatic gain control setting, whereas the weight used at the adaptor then preferably takes into account:

automatic gain control settings (e.g. by forwarding the actual AGC setting used to the adaptor) and the TDMA schedule and synchronizes the weight selection with the time-slots and adapts the weights to the respective uplink user allocated to said time-slot.

More alternative, when the sensor unit is agnostic of the TDMA schedule as described hereinabove; the weighting could alternatively be based on an automatic gain control setting that is a constant value during one TDMA frame, appropriate for the most relevant (preferably the strongest) slot signals.

In yet a further distributed approach wherein the sensor unit locally applies its weight, the local sensor unit follows the TDMA structure and in doing so becomes aware that in different slots signals arrive with different amplitudes. The local sensor then applies a constant gain only for the duration of one TDMA slot and then switches to another constant gain in the next TDMA slot. Thus in every time-slot the gain is sufficiently constant to ensure reliable detection of the symbol levels, while gain changes are performed (only) in between TDMA slots.

In an alternative distributed approach, the adaptor may communicate the TDMA schedule, or a weight based on the TDMA schedule to the respective sensor unit. The sensor unit in turn may then weight the instance of the signal from the uplink user locally. The resulting signal sent by the sensor unit may, when the allocated uplink user signal is present in the instance of the uplink signal it may thus already be amplified locally and/or when it is unlikely to be present noise may already be suppressed.

When weights are applied in a centralized manner this will result in a star-like topology, whereas when weights are applied in a distributed manner this may result in various topologies ranging from a set of interconnected stars, to a tree structure, or a daisy-chain topology. The daisy chain topology is particularly useful in that it allows for an efficient wiring of ceiling luminaires; although which particular distributed approach is most efficient generally depends on the spatial layout of the illumination system.

Wherever measured, in embodiments the signal strength may be measured based on a predetermined preamble portion included in the uplink signal from the user device 16 (i.e. a portion pre-known to the entity 13 or 3 performing the signal strength measurement.). In a TDMA system, where users repetitively use the same time slot in a frame, or where time-slots are allocated to an individual uplink user, the weights/gain settings of branches/instances are preferably kept constant, such that signal strength is preferable kept constant in successive slots for the same user, while changes preferably are applied at the transition to the next slot Optionally the adaptor 13 may also include a respective phase shifter 14a, 14b, 14c included in one or more of the signal branches to adjust the phase of one or more of the respective received signal instances. However this is not needed in all possible embodiments.

In embodiments, some or all of the weights may be non-binary, and determined so as to be in proportion (e.g. linearly proportional) to the received signal strength (e.g. RSSI). For instance the weights may be determined according to a maximum ratio combining (MRC) principle. Or in alterative embodiments, some or all of the weights may be binary weights, i.e. so the adaptor 13 acts as a selector to select only those signal instances having greater than a threshold measure of signal strength. Either way, there are a number of possibilities for the metric measuring the signal strength. In embodiments the measure of signal strength is simply an absolute measure of received signal power, e.g. RSSI. Alternatively the measure used may measure the received signal power relative to an estimated noise floor. This may simply be a fixed, predetermined (i.e. a prior) estimate of the noise floor for the region of the environment in question (e.g. the room). Alternatively the component performing the measurement (the adaptor 13 or sensor unit 3) may empirically estimate the noise floor (i.e. an a posteriori measurement). For example, noise estimation algorithms are known which can which can estimate noise based on a predetermined preamble, and/or which estimate when periods of no signal occur and use this to estimate background noise.

Figure 5:
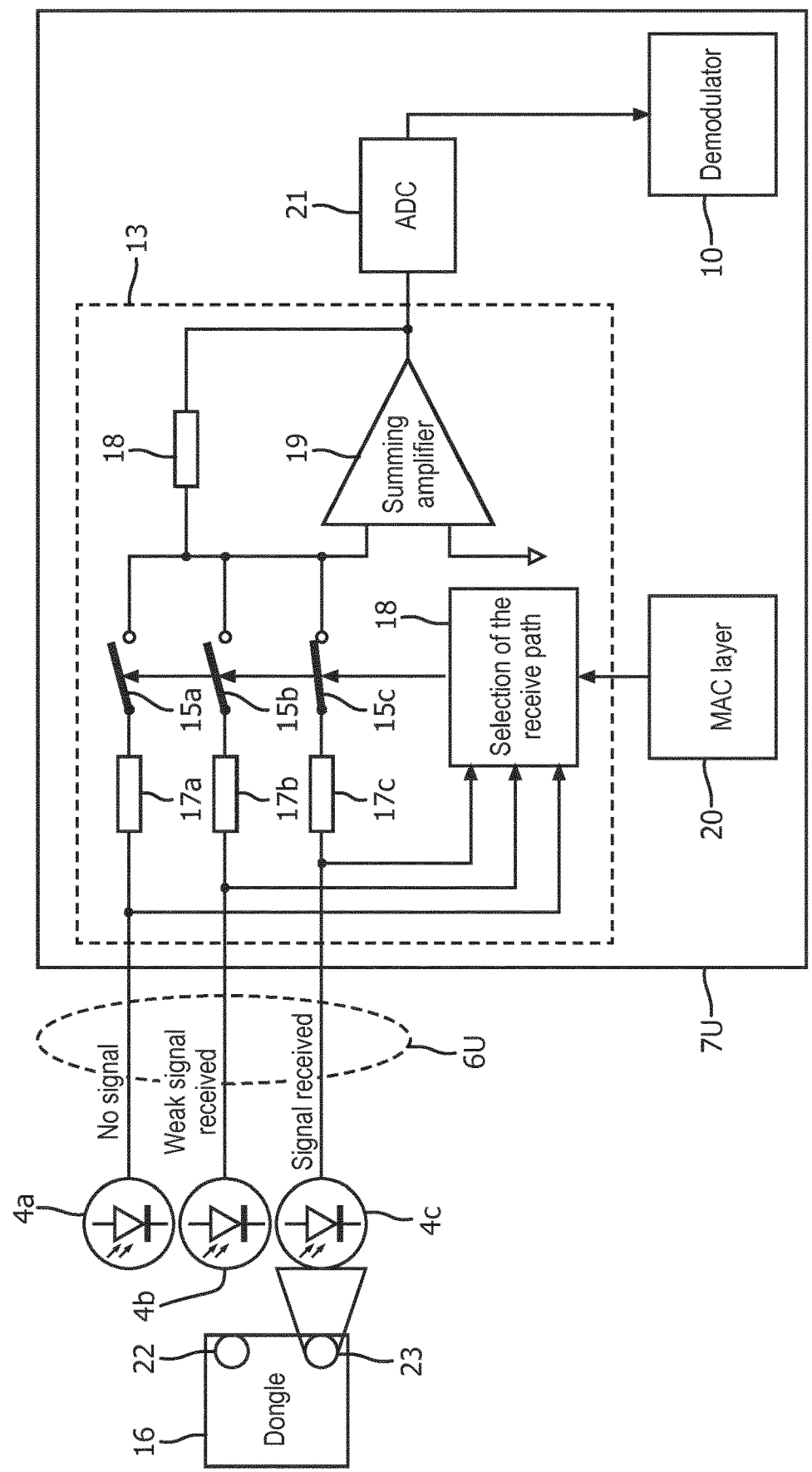
FIG. 5 is another schematic block diagram of an uplink subsystem.

FIG. 5 illustrates more details of an example implementation of embodiments where the adaptor 13 selects between binary weights, i.e. acts as a "yes/no" selector which selects whether or not to use each received signal instance. Here the adaptor 13 comprises a selector 18 and each of the weighting blocks 15 comprises a switch (e.g. transistor switch). The selector 18 is arranged to determine whether the signal strength of each signal instance exceeds a predetermined threshold. The selector 18 may perform the strength measurement and threshold comparison itself, or may determine this information based on indications reported from the sensors 3. Either way, it sets the weights 15 of those signal instances with greater than the threshold signal strength to 1 (i.e. unity), and the weights of those that do not meet the threshold to 0 (zero). The selected signal instance(s) with non-zero weights are then passed to the adder 43 to be summed. The resulting combined signal is output to an analogue-to-digital converter 21 where it is converted to digital, and then the digitally combined signal is input to the demodulator 10, e.g. which may be run on the DSP 34. In the example shown, the adder 43 is formed from a summing amplifier 19 and potential divider arrangement 17, 18. However other circuit designs are also possible.

Thus by gathering together the signal instances from the sensor units 3 of multiple luminaires 2, and selecting or favoring the strongest of those signals for use in demodulation, the different luminaires 2 can also act as one continuous logical cell, with smooth transitions at only the physical layer as the mobile device 16 moves from one node to the next.

As mentioned, in some implementations the signal strength measurements and weights may be determined in a distributed fashion, i.e. each individual sensor 3 measures the received signal strength of its own respective received signal instance, and even computes the respective weight to apply to its own respective signal instance. In this case each sensor unit 3 indicates the respective weight to the adaptor 13 in the demodulator unit 7U in order for the weights to be applied. In the case where the weights are binary ones and noughts, i.e. a selection as to whether or not to include the signal in the combination 43, then in embodiments the sensor unit 3 may implicitly indicate its respective weight simply by either sending or not sending its respective received signal instance to the adaptor 13. The adaptor 13 implicitly applies the weights by only combining those signal instances that are received.

Another term that may be used to describe the above functionality is noise gating, or a noise gating function: i.e. selecting whether to send a signal, or whether to use a received signal, in dependence on its signal strength relative to a noise floor may also be referred to as. In general noise gating can be hard (on—off), or soft (signal instances weighted by non-zero weights depending on their signal strength relative to the noise floor).

Another note with regard scenarios where a selection is made about whether or not to include individual ones of the different received signal instances in the combination 34 (i.e. the weights 15 are yes/no values as in FIG. 5 for example): in embodiments it may be desirable to include a mechanism to prevent the system flitting rapidly back and forth between selections. For example consider a case where the user is right in the middle between the coverage areas of two luminaires 2 or two subsets of luminaires 2 in the same cell 1. At this point it is "touch-and-go" whether the selection falls down on the side of selecting one luminaire/subset or the other, and any small movement in the user device 16 or small fluctuation in the received uplink signal strengths or background noise may cause the selection to switch. To avoid rapid switching back and forth between the two (or more) different outcomes of the decision, a hysteresis may be applied to the switching threshold (different threshold on the way up than on the way down). Alternatively a certain time constraint may be applied, e.g. once a decision is made this lasts at least for a minimum window of time, or the decision is only made once per periodic interval of time, e.g. once per frame or per message (i.e. don't switch mid message or mid frame).

The scheme can also be applied in a time division multiple access (TDMA) system in which different time slots are assigned to different users in the uplink. Then, the switching can be synchronized to the times of expected arrival of messages from the different users. Thus during the TDMA frame the central unit anticipates certain setting during every sub time slot, according to assigned slot to different users and previously recorded "locations" of the user in terms of best receivers for that user.

Typically, in TDMA schemes the duration of each frame and the number of individual user slots does not change rapidly over time or even is fixed in a standard. Preferably the adaptor can determine the profile of slots and signal strengths in each individual, possibly recurring, uplink user time slot. In addition, the noise levels may be assessed on a slot by slot basis, because noise due to interference can vary over the TDMA fame, particularly if interference also follows a similar/the same TDMA timing pattern.

By taking into account the TDMA time-slots and the previously known user locations, settings such as the gain settings can be selected to favor sensor signals corresponding to the instances of the uplink signal where previously the user associated with the current time-slot was detected.

Preferably in one alternative the demodulator 10 offers a TDMA synchronization reference to the adaptor 13, such that the weights 15 can be switched at the appropriate moment without the risk of timing errors.

The weights 15 can be based on a number of criteria of such as those described below, for example:
1. In every time slot, open the previously strongest path associated with the uplink user of the designated time-slot only, which is particularly interesting in a centralized adaptor 15. In a multi-user setting, selecting only the strongest and eliminating weaker branches can help to avoid that during periods of simultaneous transmissions in different locations in the network, signals interfere harmfully.
2. In every time slot, follow a gain control curve that depends on the signal strength or (SNR, SINR) in that slot for that branch only. This is particularly relevant in a distributed weight control system,
    If no signal was detected or it remains below a low-threshold the weight is set to zero,
    If the signal exceeds a predetermined threshold but is below a further pre-determined threshold indicative of being too small to be an instance of the uplink signal, the signal is attenuated in that slot to reduce the dynamic range.
3. Always keep the strongest 3 previous detections/instances of the time-slot open.
4. Use knowledge of the spatial layout of the system to select the settings/assign weights. In particular, if a signal is received strongly via one branch/instance, one can open branches/instances from neighboring locations open to already anticipate motion of the user so as to facilitate a handover. The latter works particularly well when the uplink user is known to be a slowly moving uplink user that does not "skip" sensors.
5. In the event a set predetermined period has lapsed between the last active time-slot of an uplink user that is known to be mobile and a next scheduled time-slot of the same mobile uplink user, it is advantageous not to favor the last known location, but instead to open and take into account all instances/branches, rather than favoring one or some of them.

With regard to the modulation scheme, PAM may be used on the uplink, or alternatively OFDM is not excluded. Note that the phase difference between the dominant (strong) signals will be small (e.g. comparing the area in between two luminaires). Here path differences will also be small, resulting in phase differences not more than a few tens of degrees Several topologies are possible. A first option is a star network: all receivers 3 are connected to the central modem 7. The signal processing can be centralized.

A second is daisy chaining: the central modem 7 receives it a signal from the first receiver node 3a. This first receiver node 3a has not only an output that sends the signal to the central modem 7, but also an input via which it can get signals from a secondary receiver nodes 3b, and so forth. One practical limitation of this is that, with many hops in daisy chaining, for the last receiver 3n in the daisy chain (that is to say the farthest one from the modem 7), it will be difficult to have a good SNR due to the fact that its signal will go through all others receivers $3n-1 \ldots 3c, 3b, 3a$; and more stages means more noise.

A third option is a tree topology: a hybrid of star and daisy chaining, i.e. a combination of the above two. The central modem 7 has multiple inputs, yet the receiver nodes 3 also have a mechanism to take in signals from secondary receivers.

A fourth option is a bus network: each receiver node autonomously decides what signal it puts on the bus.

In a daisy chain or bus network, each receiver 3 is autonomous and can decide itself if it is active or not, monitoring for example the average value of the received signal and comparing it to a threshold value. This has the advantage of being very simple solution, although the right threshold value will have to be calibrated to compare to the internal noise but also the ambient noise (e.g. 100 Hz from neon light).

In embodiments, the receiver node 3 autonomously sets a gain for the signal, instead of hard switching. It is favorable to make this gain proportional to the signal strengths. This reflects the idea of maximum ratio combining (MRC). Conventionally MRC is used in system in which the processing is centralized in one common block. Then also the phase adjustment 14 for all signals can be done. However, in embodiments, there may be implemented a distributed system that does an amplitude-only adjustment. For indoor optical wireless communication (OWC) such assumption is realistic: as discussed previously, phase differences can be small compared to symbol wavelength. The wavelength of light is very small, but VLC typically uses the baseband modulation of light, at symbol rates up to 10 or 100 MHz (symbol wavelengths of 30 to 3 meters). For such symbol wavelengths destructive wave interference at different luminaires is less likely to occur. Also, phase issues can be mitigated by means of optical fiber distribution and/or OFDM.

In embodiments the gain control is not always linear proportionality with signal strength: in some scenarios this may have a somewhat deleterious effect on the dynamic range of the link between receiver 3 and modem 7. For excessively constant received signals, the gain may be reduced, e.g. to a constant gain, or to a gain that reduces with signal strength (in contrast to the normal situation).

The disclosed system can also work in a star configuration, with receivers 3 setting their own gain. One possible drawback is that, for example one receiver 3 may set its own gain at maximum value (because its output noise is maximum) and this noise is added to a signal coming from a second receiver setting its minimum gain. The SNR for the signal of the second receiver may not be optimum. However, this may be mitigated by one common receiver 3 that processes the smartly combined signal from multiple nodes 3. In embodiments it may be assumed that all nodes have the same noise floor. Then according the MRC rules, only a node 3 that receives a very strong signal is allowed to apply full gain: then this becomes a dominant signal at the receiver, which is OK because it is virtually noise free. A second weaker signal can be added, but since it contains relatively more noise it should be added with lower gain. In further embodiments, different noise floor levels can also be used for different receives 3. For different noise levels, first the signals are amplified such that they have a noise level that equal to the reference noise level. After that the MRC rules apply: amplify linearly proportional to signal strength.

In a daisy chain topology, the following operations may be performed by a receiver node 3 that also has an auxiliary input: pass through at least one signal; pick the best in terms of signal strength or SNR, either the locally received signal or the incoming signal from the secondary receiver (or nodes further upstream); and combine the signal in an appropriate way, preferably applying MRC.

In another embodiment, distributed MRC may be applied in a tree structure. In this case every receiver node 3 in the system can evaluate signal strength and noise levels. It can be shown that MRC operated separately in every node leads to MRC of the entire signal.

In some cases the system may not be able to evaluate noise levels, but can apply an automatic gain, where the gain depends on the signal strength. A solution to this in a daisy chain or tree topology is to have the system measure the amplitude strength A_local of the locally received signal and A_aux of the auxiliary signal; and to pass through the incoming signal with amplification A_aux and the locally received signal with amplification A_Local.

In another daisy chain embodiment, each receiver 3 monitors the average value of the received signal and sends information to the modem 7 that will decide if it will use or not the received signal. An advantage of this is that it is a simple solution to implement: the modem 7 manages directly all signals from receivers 3 and avoids a state where no received signals could arrive to the modem. An extra connection may be provided to supply the average value.

In another embodiment that may apply to any topology, each receiver 3 sends directly the received signal to the modem 7 and the modem will monitor information to detect if a user is under the receiver 3 or not. The user detection can be made for example in one of two ways: (a) extraction of the average value of the received signal and compare it to a threshold; or (b) demodulation of the received signal and detection of a preamble and/or user ID. Once, the modem 7 has the information from each receiver 3, it can select which signal will be used and when. Thus, this will limit the number of received signals that will be summed and so limit the deterioration of the noise level.

Figure 8:
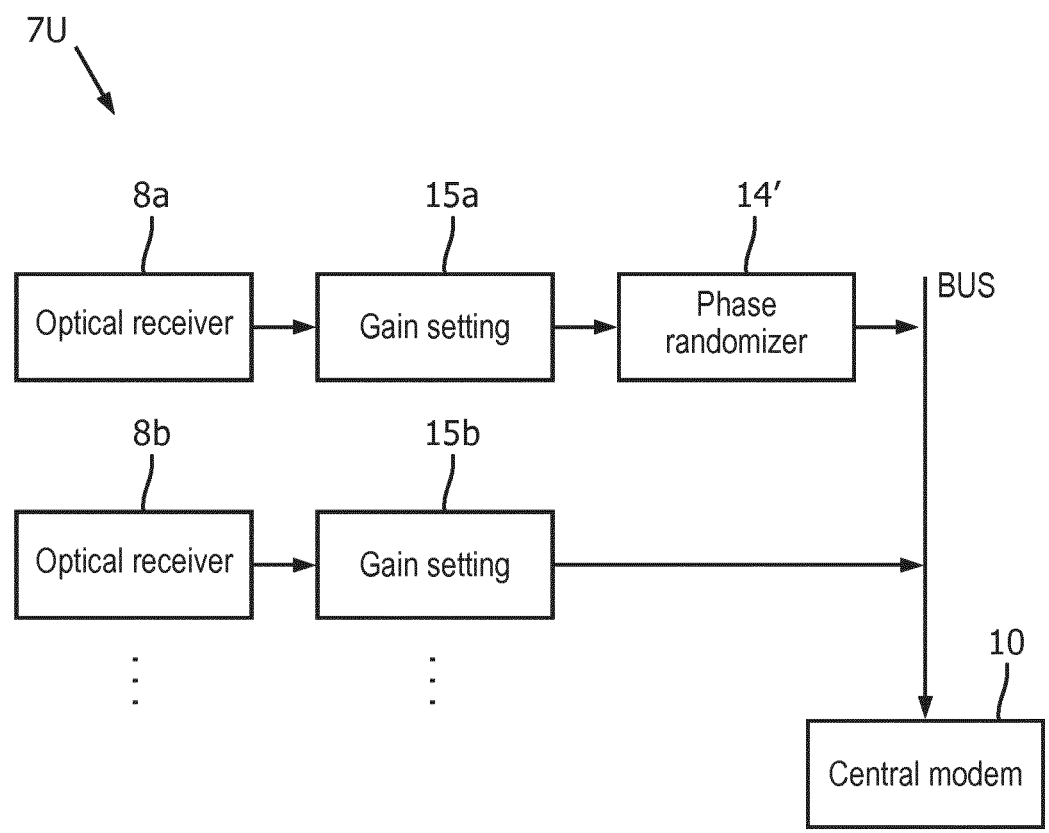
FIG. 8 is another schematic block diagram of an uplink subsystem.

FIG. 8 illustrates another idea that can be used for multi-receiver for optical fiber (e.g. POF) systems or even systems using other transmission media such as coaxial cable with poor group delay properties. The approach illustrated in FIG. 8 is to include a phase shifter 14' on at least one of the received branches to intentionally make the phase differences between the signal instances from different receiver nodes 3 intentionally larger, and substantially different on different subcarriers, but not so large that OFDM no longer works.

This handles the case where the phase difference between signal instances received at different sensors or receivers 3 is not so small that the phase cancellation effect cannot be neglected. The idea is then the opposite of attempting to minimize phase differences (as discussed previously), i.e. large phase differences are deliberately introduced, but different phase differences per subcarrier frequency. This may also be referred to as delay diversity. The advantage is that it deals with the risk that the entire frequency band exhibits the same wave cancellation, which may happen in cases of short delays. If the entire frequency band does exhibit the same wave cancellation, then cancellation is "all or nothing", i.e. whilst there may be no cancellation, there is also a risk that every subcarrier experiences cancellation. Delay diversity avoids this: the entire band cannot cancel. There will always be some good part in the frequency band (and some bad part).

The phase considerations then shift from ensuring accurate phase alignment to avoiding that more than 50% of the signal frequency components are cancelled. OFDM is robust against wave cancellation at a few subcarriers, but not against cancellation at all frequencies. It may be chosen to have different degrees of cancellation for all subcarriers. For example the phase offsets may be randomized, or a constant delay can be chosen as it leads to different phase angles at different frequencies. By randomizing the phases or such like, one can ensure amplification occurs on at least half the subcarriers. If the system uses OFDM, it may be made quite robust to amplitude differences on different subcarriers by applying extensive coding across subcarriers. Hence redundancy can fill in for missing subcarriers.

Note that the same idea can additionally (or alternatively) be applied on the downlink: i.e. a deliberate phase shift is introduced between two or more of the signal instances emitted from different luminaires.

In further embodiments the system allows multiple access, i.e. access by multiple users using multiple respective user devices 16 at once, on the uplink and/or downlink. In embodiments time division multiple access (TDMA) may be used as the multiplexing scheme for this. I.e. on the downlink each user device 16 is assigned a different respective time slot in a repeating series of time slots, and/or on the uplink each user device 16 is assigned a different respective time slot in a repeating series of time slots. The user devices 16 may be required to register with the cell in order to be allocated a time slot. This may be referred to as "pairing".

Figure 6:
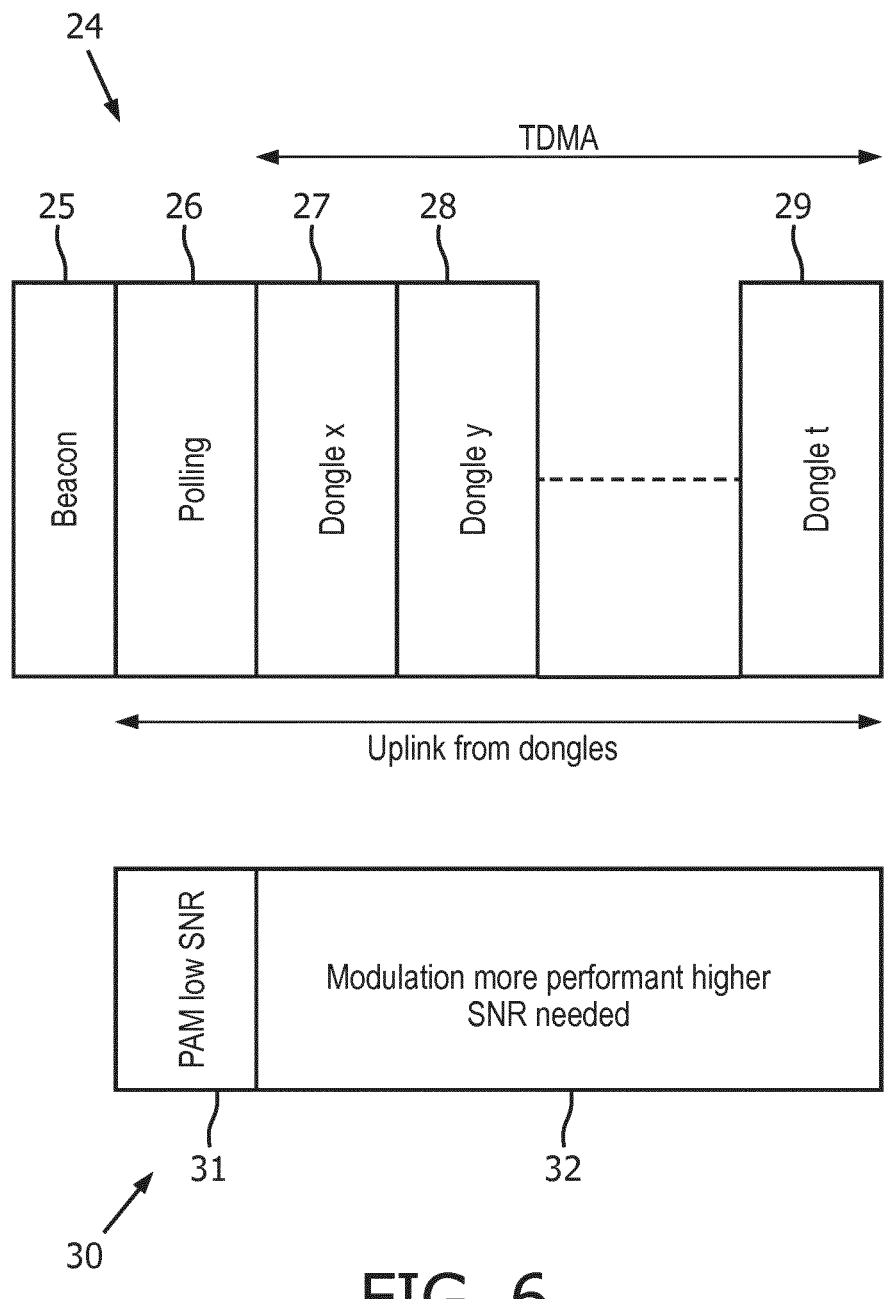
FIG. 6 is a schematic representation signals that may be sent on the uplink and downlink.
Figure 7:
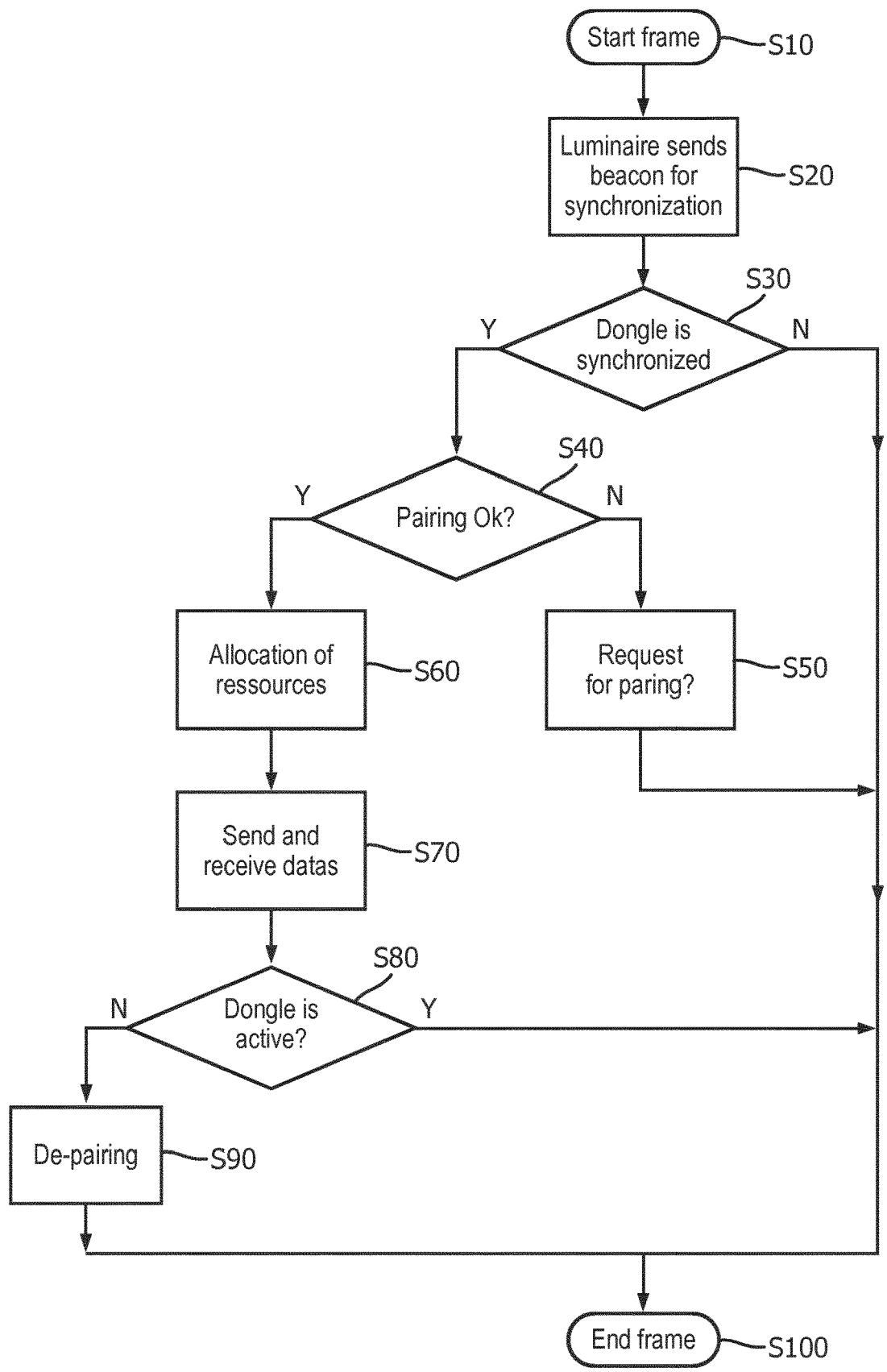
FIG. 7 is a schematic flow chart of a method of sending and receiving data between the illumination system and a user device.

FIGS. 6 and 7 illustrate aspects of the presently disclosed system that may be applied in the MAC (medium access control) protocol 20.

Communication via the disclosed optical communication system may be based on a frame structure such as that shown in FIG. 6.

The top diagram in FIG. 6 shows an example of a downlink frame 24. The first part is the beacon part 24: during this time the modem 7 via the luminaire 2 (downlink) sends information for synchronization and allocation resources. In the second part 25, the polling, all user devices 16 (e.g. by means of their dongles) can communicate with the system to request pairing with the present cell, or if already paired send a signal to keep alive this association. In the third part each currently paired user device 16 has its own period 27, 28 . . . to communicate with the modem (i.e. a respective TDMA time slot).

During the polling period 26, the data rate is low, and each user device 16 sends a request for pairing or sends its ID to keep alive the optical link (i.e. keep alive the pairing). During this period 26 there is a small chance of collision between requests from different user devices 16. This can be dealt with by configuring the user device 16 so as, for example, if a request fails, to automatically resend the request after a random back-off period.

The lower diagram in FIG. 6 shows an example of an uplink frame 30. The first part 31 is a preamble based upon which the sensor unit 3 or adaptor 13 can measure the received signal strength, e.g. RSSI or SNR. The second part 32 is the data payload, i.e. user data or application data.

A mechanism for establishing communication is shown in FIG. 7. The various steps attributed to the "system" may be performed either by the luminaire 2 or an upstream network controller, or a combination of the two. For instance the network controller may be a function of the modem device 7, or a network element higher upstream.

At step S10 the start of a downlink frame 24 begins. At step S20 the luminaire 2 emits the beacon 25 for synchronization. At step S30 the system determines whether the user device 16 is synchronized. If not it jumps to step S100 where the frame 24 ends. But if so the system progresses to step S40 where it determines whether the user device 16 has successfully paired with the cell 1 via the luminaire 2. If not the process goes to step S50 where a request for pairing is sent from the user device 16 (e.g. from its dongle) to the system. Then the process jumps to step S100 where the frame 24 ends. If the user does 16 does successfully pair on the other hand, the system progresses to step S60 where it allocates resources to the user device including a time slot 27. The network and user device 16 can then (step S70) send and receive data between one another via the luminaries 2 of the cell 1. At step S80 the system then determines whether the user device 16 is still active in its communications. If so the system progresses to step S100 where the frame 24 ends. Otherwise the system first progresses to step S90 where it de-pairs with the user device 16, then to step S100 where the frame ends.

In some embodiments the modulation used on the uplink and/or downlink may be as simple as PAM. For a good communication link, the requested SNR should be low. The modem 7 can activate all receivers at the same time and it waits for detection of one or more user devices 16. As soon as a user device 16 is detected, the modem 7 will determine under which receiver 3 the user is located, in embodiments enabling only one receiver 3 at a time to check which receiver could receive signal from the user device 16 and measuring strength signal (e.g. RSSI). In the MAC layer 20, the modem 7 will store the optimum receiver 3 for each user device 16.

In the third part of the frame 27, the modem 7 knows which user device communicates and when, so it will select the best receiver 3 for that user device. If the data rate is higher, the modulation used could be a PAM-4 scheme or higher, or even OFDM. In that case, SNR should be largely improved compared to the polling period 26. This is done by enabling only one receiver 3 at the time. Remark: enabling means that the output signal of the receiver(s) 3 in question is/are provided to the demodulator channel 10. The receivers 3 are always on.

It will be appreciated that the above embodiments have been described by way of example only.

For instance, where it is said that each of the luminaires 2 emits a different instance of the same signal, or same modulated waveform, or such like, this does not exclude that small phase shift or other insubstantial differences (i.e. differences which are negligible in terms of the working of the downlink subsystem). Rather, the "same" signal means the same data symbols sent using substantially the same form of modulation, such that the multiple received instances will superimpose to a coherent signal at the receiving user device, in the sense that the superposition can be successfully demodulated and decoded. Further, the downlink subsystem does not have to be used to transmit different instances of the same signal on all possible occasions. At some times the signals could be the same and at other times different data or waveforms could be transmitted. In such systems the signal referred to for the present purposes is that portion of the data transmitted at times where the signal instances transmitted from the luminaires in question are substantially the same.

In other words, the signal or waveform in question refers to the essential aspects of the modulated symbols required to add up coherently to a demodulatable and decodable piece of information at the receiving user device.

In further embodiments, the downlink signal may be transmitted via the medium of infrared instead of visible light. In this case the lighting element controlled to emit the downlink signal is an IR emitter, e.g. formed from one or more IR LEDs. For instance the one or more IR LEDs may be nestled amongst the visible illumination-emitting LEDs of each luminaire 2. Also the uplink is not limited to IR. Instead for example a different unlicensed medium such as ultrasound may be used for the uplink. Where IR is used for the uplink and downlink, these may be transmitted on different IR bands (i.e. frequency division multiplexing). Alternatively it is not excluded that the up- and downlink share the same IR carrier wavelength (or at least have overlapping IR bands, e.g. at 850 and 940 nanometers). In this case another multiplexing technique may be used between uplink and down can be an option, e.g. time division multiplexing with separate time slots for up and downlink (and for multiple access, separate for pairs of slots for different user signals).

Further, the scope of the present disclosure is not limited by the above-mentioned symbol wavelengths and corresponding data rates in all possible embodiments even though these are particularly suitable for phosphor covered LEDs. For instance infrared LEDs may be modulated at higher speeds, and IR signals may go above 100 mega-symbols per second. In such cases the phase differences may become more critical, but this can be handled with mechanisms such as phase randomization or delay diversity to avoid the "all or nothing" effect; and/or taking precautions that in transition areas where the user device 16 sees multiple LEDs such that the propagation & cable delay are sufficiently similar, and/or ensuring not too wide a beam is used (that would otherwise give a large overlap).

Further, the downlink distribution network 6U need not necessarily be formed of optical fiber. Alternatively this may be replaced by low delay guided communication means, such as high quality coaxial cable, particularly if other measures are taken to mitigate phase differences such as employing OFDM as the downlink modulation scheme. Similarly the uplink distribution network 6U need not be implemented with optical fiber, and could instead be implemented using, e.g., high quality coaxial cable.

Furthermore, the illumination system disclosed herein is not limited to duplex communications. In other applications the uplink or downlink subsystems disclosed herein may be used independently.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An uplink subsystem for use in an illumination system arranged for optical communication, the uplink subsystem comprising:
   a group of luminaires;
   a group of sensors each for sampling a respective instance of an uplink signal transmitted wirelessly from a user device, with a different respective one of the sensors being incorporated in or co-located with each of the luminaires of said group, or the sensors being interspersed amongst the luminaires so as to serve a same region of space as illuminated by the group of luminaires;
   a demodulator unit; and
   an uplink distribution network arranged to supply the respective instance of the uplink signal from each of group of the sensors to the demodulator unit;
   wherein the demodulator unit comprises an adaptor arranged so as, based on a measurement of a respective received signal strength of each of the instances of the uplink signal, to apply a respective weight to each instance in dependence on the respective measurement of received signal strength, and to combine said instances of the uplink signal following the application of said weights, thereby producing a combined signal; and
   the demodulator unit further comprises a demodulator arranged to demodulate the combined signal
   and wherein
   the uplink subsystem utilizes a Time Division Multiplex Access scheme in which time-slots are assigned to individual uplink users and wherein the adaptor assigns weights on a time-slot basis based on a respective uplink user assigned to a respective time-slot and previously recorded instances of the uplink signal where said user's uplink signal was detected, such that the switching of the weights for the instances of the uplink signal are synchronized with the time-slots and the weights are adapted for expected arrival of signals from the uplink user associated with the current time-slot.

2. The uplink subsystem of claim 1, wherein the adaptor is implemented as one of:
   a centralized adaptor, the centralized adaptor arranged to receive signals from the sensors of the group of sensors and combines instance of the uplink signal at the centralized adaptor,
   a first distributed adaptor, the first distributed adaptor arranged to receive signals from the sensors of the group of sensors and combine instances of the uplink signal in a distributed manner and
   a second distributed adaptor, the second distributed adaptor arranged to receive signals from the sensors of the group of sensors and combine instances of the uplink signal using a daisy chain approach.

3. The uplink subsystem of claim 1, wherein the adaptor is configured to select said weights from a set comprising at least zero and one, and to select some of the weights to be zero if the respective measurement of received signal strength is below a threshold.

4. The uplink subsystem of claim 1, wherein the measurement of received signal strength is a measure of signal strength relative to a noise floor; wherein either the noise floor is predetermined, or the adaptor is configured to determine the noise floor empirically based on a predetermined preamble in the uplink signal or a noise estimation algorithm which estimates the noise floor in presence during estimated periods of no uplink signal.

5. The uplink subsystem of claim 1, wherein the uplink distribution network via which the instances of the uplink signal are supplied to demodulator unit is wholly or partially formed from optical fiber.

6. The uplink subsystem of claim 1, wherein each of the luminaires is also arranged to emit a downlink signal by means of one of visible light communication of infrared light communication for detection by the user device.

7. The uplink subsystem of claim 1, wherein each of said sensors comprises an infrared sensor, the uplink signal being received from the user device via infrared.

8. The uplink subsystem of claim 1, wherein the uplink signal is modulated according to an OFDM scheme comprising different uplink subcarriers, and the demodulator unit comprises a phase shifter arranged to introduce a delay diversity between different ones of the uplink subcarriers.

9. An illumination system arranged for optical communication, the illumination system comprising an uplink subsystem according to claim 1 and a downlink subsystem,
   the downlink subsystem comprising:
   a group of luminaires;
   a modulator unit for controlling the group of luminaires to emit a downlink signal for detection by a user device; and
   a downlink distribution network connecting the modulator unit to each of the luminaires in said group;
   wherein the modulator unit comprises a modulator configured to generate a modulated waveform corresponding to the downlink signal, and is arranged to transmit the modulated waveform to each of the luminaires in said group over the downlink distribution network;
   each of the luminaires in said group comprises a lighting element for emitting light, and driver circuitry for driving the lighting element with a drive current powering the lighting element to emit said light; and
   each of the luminaires in the group is arranged to receive the same modulated waveform from the modulator over the downlink distribution network, and further comprises a signal injector arranged to inject the modulated waveform into said drive current in order to cause the downlink signal to be embedded in the emitted light.

10. The system of claim 9, wherein said lighting element is an illumination element for emitting visible illumination and infrared light, said light in which the downlink signal is embedded being the infrared illumination.

11. The system of claim 9, wherein some or all of the downlink distribution network is formed from optical fiber routed through a same conduit or conduits as one or more power lines arranged to power one or more of the luminaires, the modulator unit and/or one or more other components.

12. The system of claim 9, wherein the modulator is configured to generate said modulated waveform according to an OFDM scheme, such that the modulated waveform as transmitted over the downlink distribution network takes the form of an OFDM modulated waveform.

13. The system of claim 9, wherein the downlink signal has a symbol wavelength in air when embedded in the light of greater than 3m.

14. The system of claim 9, comprising a plurality of spatial regions optically separated from one another by opaque partitions, each of said regions comprising a respective set of data-emitting luminaires emitting light embedded with data, said group of luminaires being the set of data-emitting luminaires in one of said regions and said downlink signal communicating the respective data for that region;

wherein within each given one of said regions only the same data is embedded in any light emitted into that region, but the light emitted in different ones of said regions is embedded with different data.

15. The system of claim 9, wherein the group of luminaires of the downlink subsystem being the group of luminaries of the uplink subsystem.

\* \* \* \* \*